United States Patent
Ding et al.

(10) Patent No.: US 11,758,168 B2
(45) Date of Patent: Sep. 12, 2023

(54) CONTENT-ADAPTIVE ONLINE TRAINING WITH SCALING FACTORS AND/OR OFFSETS IN NEURAL IMAGE COMPRESSION

(71) Applicant: Tencent America LLC, Palo Alto, CA (US)

(72) Inventors: Ding Ding, Palo Alto, CA (US); Wei Jiang, Sunnyvale, CA (US); Wei Wang, San Jose, CA (US); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 0 days.

(21) Appl. No.: 17/730,000

(22) Filed: Apr. 26, 2022

(65) Prior Publication Data

US 2022/0353522 A1     Nov. 3, 2022

Related U.S. Application Data

(60) Provisional application No. 63/182,418, filed on Apr. 30, 2021.

(51) Int. Cl.
*H04N 19/00*     (2014.01)
*H04N 19/44*     (2014.01)
(Continued)

(52) U.S. Cl.
CPC .............. *H04N 19/44* (2014.11); *G06N 3/04* (2013.01); *H04N 19/13* (2014.11); *H04N 19/149* (2014.11); *H04N 19/184* (2014.11)

(58) Field of Classification Search
CPC ...... H04N 19/44; H04N 19/13; H04N 19/149; H04N 19/184; G06N 3/04
See application file for complete search history.

(56) References Cited

U.S. PATENT DOCUMENTS

| | | | |
|---|---|---|---|
| 2020/0160565 A1* | 5/2020 | Ma | H04N 19/60 |
| 2022/0141455 A1* | 5/2022 | Cricri | H04N 19/176 |
| | | | 375/240.02 |
| 2022/0272345 A1* | 8/2022 | Besenbruch | G06N 3/084 |

FOREIGN PATENT DOCUMENTS

WO     2020165493 A1     8/2020

OTHER PUBLICATIONS

International Search Report dated Jul. 20, 2022 in Application No. PCT/US2022/072024, pp. 1-11.

* cited by examiner

*Primary Examiner* — Zhihan Zhou
(74) *Attorney, Agent, or Firm* — ARENTFOX SCHIFF LLP

(57) ABSTRACT

Aspects of the disclosure provide methods, apparatuses, and a non-transitory computer-readable storage medium for video encoding and video decoding. An apparatus for video decoding can include processing circuitry. The processing circuitry is configured to decode neural network update information in a coded bitstream for at least one neural network in the video decoder. The at least one neural network is configured with a set of pretrained parameters, and the neural network update information indicates a first modification parameter. The processing circuitry is configured to update the set of pretrained parameters in the at least one neural network in the video decoder based on the first modification parameter. The processing circuitry is configured to decode an encoded image based on the updated at least one neural network.

20 Claims, 17 Drawing Sheets

(51) Int. Cl.
*H04N 19/149* (2014.01)
*G06N 3/04* (2023.01)
*H04N 19/184* (2014.01)
*H04N 19/13* (2014.01)

FIG. 10
Main encoder network

Conv: 5x5 c192 s2
GDN
Conv: 5x5 c192 s2
GDN
Conv: 5x5 c192 s2
GDN
Conv: 5x5 c192 s2

FIG. 11
Main decoder network

DeConv: 5x5 c192 s2
IGDN
DeConv: 5x5 c192 s2
IGDN
DeConv: 5x5 c192 s2
IGDN
DeConv: 5x5 c3 s2
IGDN

FIG. 12
Hyper encoder

Conv: 3x3 c192 s1
Leaky ReLU
Conv: 5x5 c192 s2
Leaky ReLU
Conv: 5x5 c192 s2

FIG. 13
Hyper decoder

DeConv: 5x5 c192 s2
Leaky ReLU
DeConv: 5x5 c288 s2
Leaky ReLU
DeConv: 3x3 c384 s1

FIG. 14
Context model NN

Masked: 5x5 c384 s1

FIG. 15
Entropy parameter NN

Conv: 1x1 c640 s1
Leaky ReLU
Conv: 1x1 c512 s1
Leaky ReLU
Conv: 1x1 c384 s1

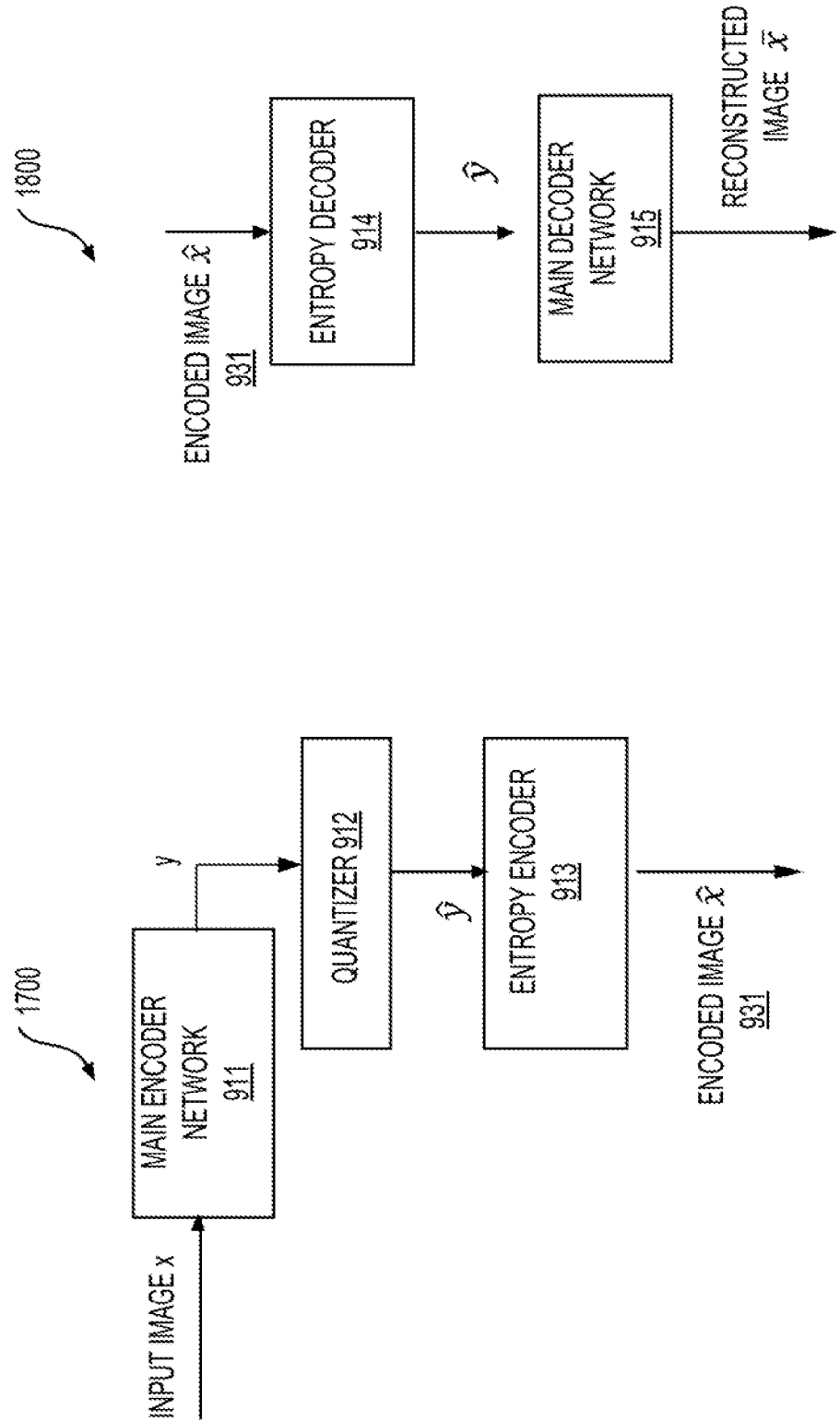

CONTENT-ADAPTIVE ONLINE TRAINING WITH SCALING FACTORS AND/OR OFFSETS IN NEURAL IMAGE COMPRESSION

INCORPORATION BY REFERENCE

This present disclosure claims the benefit of priority to U.S. Provisional Application No. 63/182,418, "Content-Adaptive Online Training with Scaling Factor and Offset in Neural Image Compression" filed on Apr. 30, 2021, which is incorporated by reference herein in its entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding can be performed using inter-picture prediction with motion compensation. Uncompressed digital image and/or video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed image and/or video has specific bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of video coding and decoding can be the reduction of redundancy in the input image and/or video signal, through compression. Compression can help reduce the aforementioned bandwidth and/or storage space requirements, in some cases by two orders of magnitude or more. Although the descriptions herein use video encoding/decoding as illustrative examples, the same techniques can be applied to image encoding/decoding in similar fashion without departing from the spirit of the present disclosure. Both lossless compression and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

A video encoder and decoder can utilize techniques from several broad categories, including, for example, motion compensation, transform, quantization, and entropy coding.

Video codec technologies can include techniques known as intra coding. In intra coding, sample values are represented without reference to samples or other data from previously reconstructed reference pictures. In some video codecs, the picture is spatially subdivided into blocks of samples. When all blocks of samples are coded in intra mode, that picture can be an intra picture. Intra pictures and their derivations such as independent decoder refresh pictures, can be used to reset the decoder state and can, therefore, be used as the first picture in a coded video bitstream and a video session, or as a still image. The samples of an intra block can be exposed to a transform, and the transform coefficients can be quantized before entropy coding. Intra prediction can be a technique that minimizes sample values in the pre-transform domain. In some cases, the smaller the DC value after a transform is, and the smaller the AC coefficients are, the fewer the bits that are required at a given quantization step size to represent the block after entropy coding.

Traditional intra coding such as known from, for example MPEG-2 generation coding technologies, does not use intra prediction. However, some newer video compression technologies include techniques that attempt, from, for example, surrounding sample data and/or metadata obtained during the encoding and/or decoding of spatially neighboring, and preceding in decoding order, blocks of data. Such techniques are henceforth called "intra prediction" techniques. Note that in at least some cases, intra prediction is using reference data only from the current picture under reconstruction and not from reference pictures.

There can be many different forms of intra prediction. When more than one of such techniques can be used in a given video coding technology, the technique in use can be coded in an intra prediction mode. In certain cases, modes can have submodes and/or parameters, and those can be coded individually or included in the mode codeword. Which codeword to use for a given mode, submode, and/or parameter combination can have an impact in the coding efficiency gain through intra prediction, and so can the entropy coding technology used to translate the codewords into a bitstream.

A certain mode of intra prediction was introduced with H.264, refined in H.265, and further refined in newer coding technologies such as joint exploration model (JEM), versatile video coding (VVC), and benchmark set (BMS). A predictor block can be formed using neighboring sample values belonging to already available samples. Sample values of neighboring samples are copied into the predictor block according to a direction. A reference to the direction in use can be coded in the bitstream or may itself be predicted.

Referring to FIG. 1A, depicted in the lower right is a subset of nine predictor directions known from H.265's 33 possible predictor directions (corresponding to the 33 angular modes of the 35 intra modes). The point where the arrows converge (101) represents the sample being predicted. The arrows represent the direction from which the sample is being predicted. For example, arrow (102) indicates that sample (101) is predicted from a sample or samples to the upper right, at a 45 degree angle from the horizontal. Similarly, arrow (103) indicates that sample (101) is predicted from a sample or samples to the lower left of sample (101), in a 22.5 degree angle from the horizontal.

Still referring to FIG. 1A, on the top left there is depicted a square block (104) of 4×4 samples (indicated by a dashed, boldface line). The square block (104) includes 16 samples, each labelled with an "S", its position in the Y dimension (e.g., row index) and its position in the X dimension (e.g., column index). For example, sample S21 is the second sample in the Y dimension (from the top) and the first (from the left) sample in the X dimension. Similarly, sample S44 is the fourth sample in block (104) in both the Y and X dimensions. As the block is 4×4 samples in size, S44 is at the bottom right. Further shown are reference samples that follow a similar numbering scheme. A reference sample is labelled with an R, its Y position (e.g., row index) and X position (column index) relative to block (104). In both H.264 and H.265, prediction samples neighbor the block under reconstruction; therefore no negative values need to be used.

Intra picture prediction can work by copying reference sample values from the neighboring samples as appropriated by the signaled prediction direction. For example, assume the coded video bitstream includes signaling that, for this block, indicates a prediction direction consistent with arrow (102)—that is, samples are predicted from a prediction sample or samples to the upper right, at a 45 degree angle from the horizontal. In that case, samples S41, S32, S23, and S14 are predicted from the same reference sample R05. Sample S44 is then predicted from reference sample R08.

In certain cases, the values of multiple reference samples may be combined, for example through interpolation, in order to calculate a reference sample; especially when the directions are not evenly divisible by 45 degrees.

The number of possible directions has increased as video coding technology has developed. In H.264 (year 2003), nine different direction could be represented. That increased to 33 in H.265 (year 2013), and JEM/VVC/BMS, at the time of disclosure, can support up to 65 directions. Experiments have been conducted to identify the most likely directions, and certain techniques in the entropy coding are used to represent those likely directions in a small number of bits, accepting a certain penalty for less likely directions. Further, the directions themselves can sometimes be predicted from neighboring directions used in neighboring, already decoded, blocks.

FIG. 1B shows a schematic (110) that depicts 65 intra prediction directions according to JEM to illustrate the increasing number of prediction directions over time.

The mapping of intra prediction directions bits in the coded video bitstream that represent the direction can be different from video coding technology to video coding technology; and can range, for example, from simple direct mappings of prediction direction to intra prediction mode, to codewords, to complex adaptive schemes involving most probable modes, and similar techniques. In all cases, however, there can be certain directions that are statistically less likely to occur in video content than certain other directions. As the goal of video compression is the reduction of redundancy, those less likely directions will, in a well working video coding technology, be represented by a larger number of bits than more likely directions.

Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", Dec. 2016). Out of the many MV prediction mechanisms that H.265 offers, described here is a technique henceforth referred to as "spatial merge".

Referring to FIG. 2, a current block (201) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (202 through 206, respectively). In H.265, the MV prediction can use predictors from the same reference picture that the neighboring block is using.

SUMMARY

Aspects of the disclosure provide methods and apparatuses for video encoding and decoding. In some examples, an apparatus for video decoding includes processing circuitry. The processing circuitry is configured to decode neural network update information in a coded bitstream for at least one neural network in the video decoder. The at least one neural network is configured with a set of pretrained parameters. The neural network update information indicates a first modification parameter. The set of pretrained parameters in the at least one neural network in the video decoder is updated based on the first modification parameter. An encoded image is decoded based on the updated at least one neural network.

In an embodiment, the first modification parameter is a scaling factor. The set of pretrained parameters is replaced with a set of replacement parameters, respectively. The set of replacement parameters is the set of pretrained parameters multiplied with the scaling factor. In an example, the neural network update information indicates an offset to modify the set of pretrained parameters. The offset is added to the set of replacement parameters in the at least one neural network.

In an embodiment, the first modification parameter is an offset. The offset is added to the set of pretrained parameters in the at least one neural network.

In an embodiment, the coded bitstream indicates one or more encoded bits used to determine a context model for decoding the encoded image. The at least one neural network includes one or more of a main decoder network, a context model neural network, an entropy parameter neural network, and a hyper decoder network in the video decoder. The one or more encoded bits are decoded using the hyper decoder network. The processing circuitry determines a context model using the context model network and the entropy parameter network based on the decoded bits and a quantized latent of the encoded image that is available to the context model network. The processing circuitry decodes the encoded image with the main decoder network and the context model.

In an embodiment, the at least one neural network is one or more of a main decoder network, a context model neural network, an entropy parameter neural network, and a hyper decoder network in the video decoder.

In an embodiment, the set of pretrained parameters includes biases in a convolutional layer of one of the at least one neural network.

In an embodiment, the set of pretrained parameters includes weights in a convolutional kernel of a convolutional layer of one of the at least one neural network.

In an embodiment, the neural network update information indicates a second modification parameter for the at least one neural network configured with a second set of pretrained parameters. The processing circuitry updates the second set of pretrained parameters in the at least one neural network based on the second modification parameter.

In an example, the set of pretrained parameters includes weights in a convolutional kernel of a convolutional layer of one of the at least one neural network. The second set of pretrained parameters includes biases of the convolutional layer of the one of the at least one neural network.

In an example, the processing circuitry decodes another encoded image in the coded bitstream based on the updated at least one neural network.

Aspects of the disclosure also provide a non-transitory computer-readable storage medium storing a program executable by at least one processor to perform the methods for video encoding and decoding.

BRIEF DESCRIPTION OF THE DRAWINGS

Further features, the nature, and various advantages of the disclosed subject matter will be more apparent from the following detailed description and the accompanying drawings in which:

FIG. 10 shows an exemplary convolution neural network (CNN) of a main encoder network according to an embodiment of the disclosure.

FIG. 11 shows an exemplary CNN of a main decoder network according to an embodiment of the disclosure.

FIG. 12 shows an exemplary CNN of a hyper encoder according to an embodiment of the disclosure.

FIG. 13 shows an exemplary CNN of a hyper decoder according to an embodiment of the disclosure.

FIG. 14 shows an exemplary CNN of a context model network according to an embodiment of the disclosure.

FIG. 15 shows an exemplary CNN of an entropy parameter network according to an embodiment of the disclosure.

FIG. 17 shows an exemplary video encoder according to an embodiment of the disclosure.

FIG. 18 shows an exemplary video decoder according to an embodiment of the disclosure.

DETAILED DESCRIPTION OF EMBODIMENTS

I. Communication Systems, Video Encoders, and Video Decoders

Figure 1A:
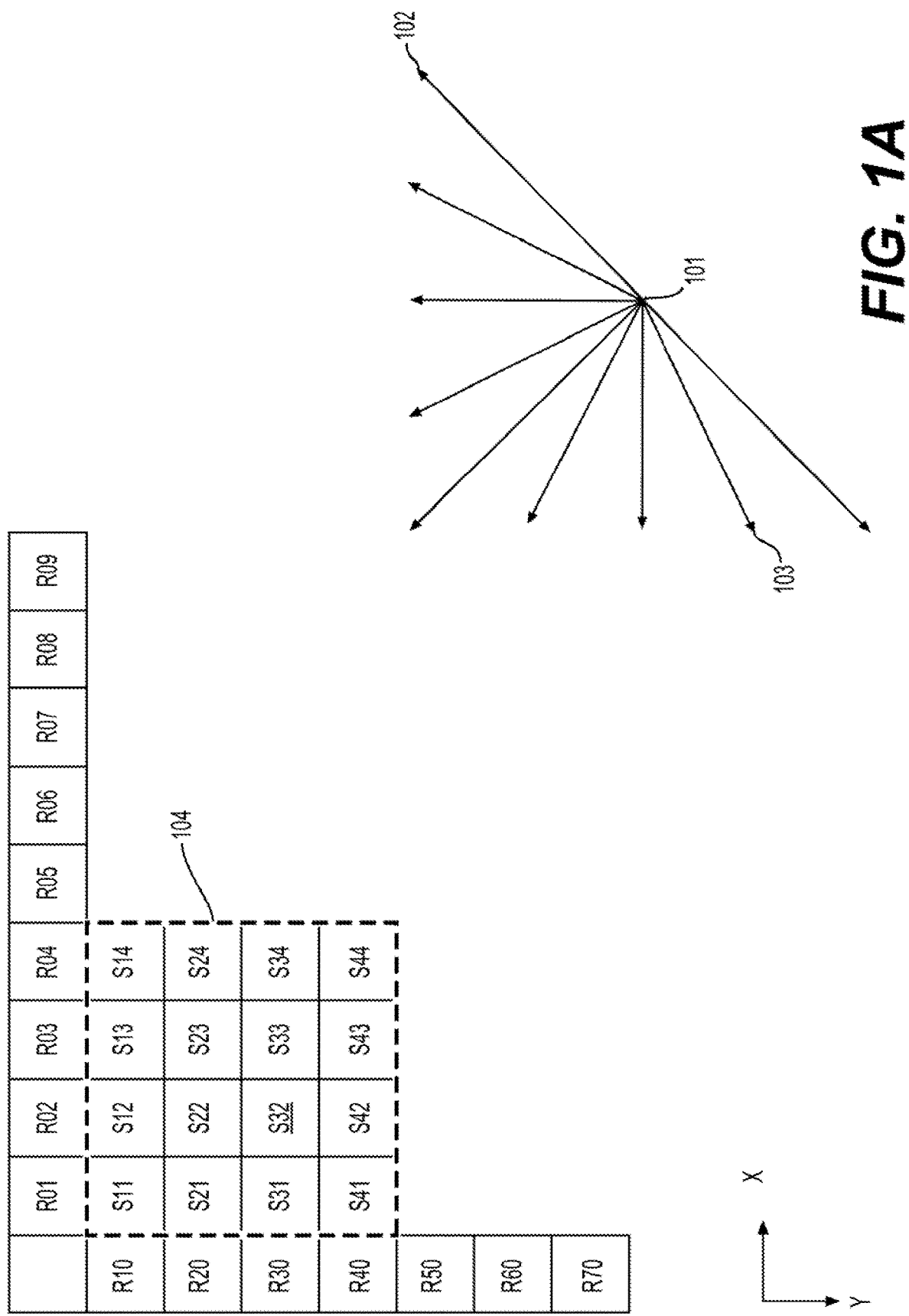
FIG. 1A is a schematic illustration of an exemplary subset of intra prediction modes.
Figure 1B:
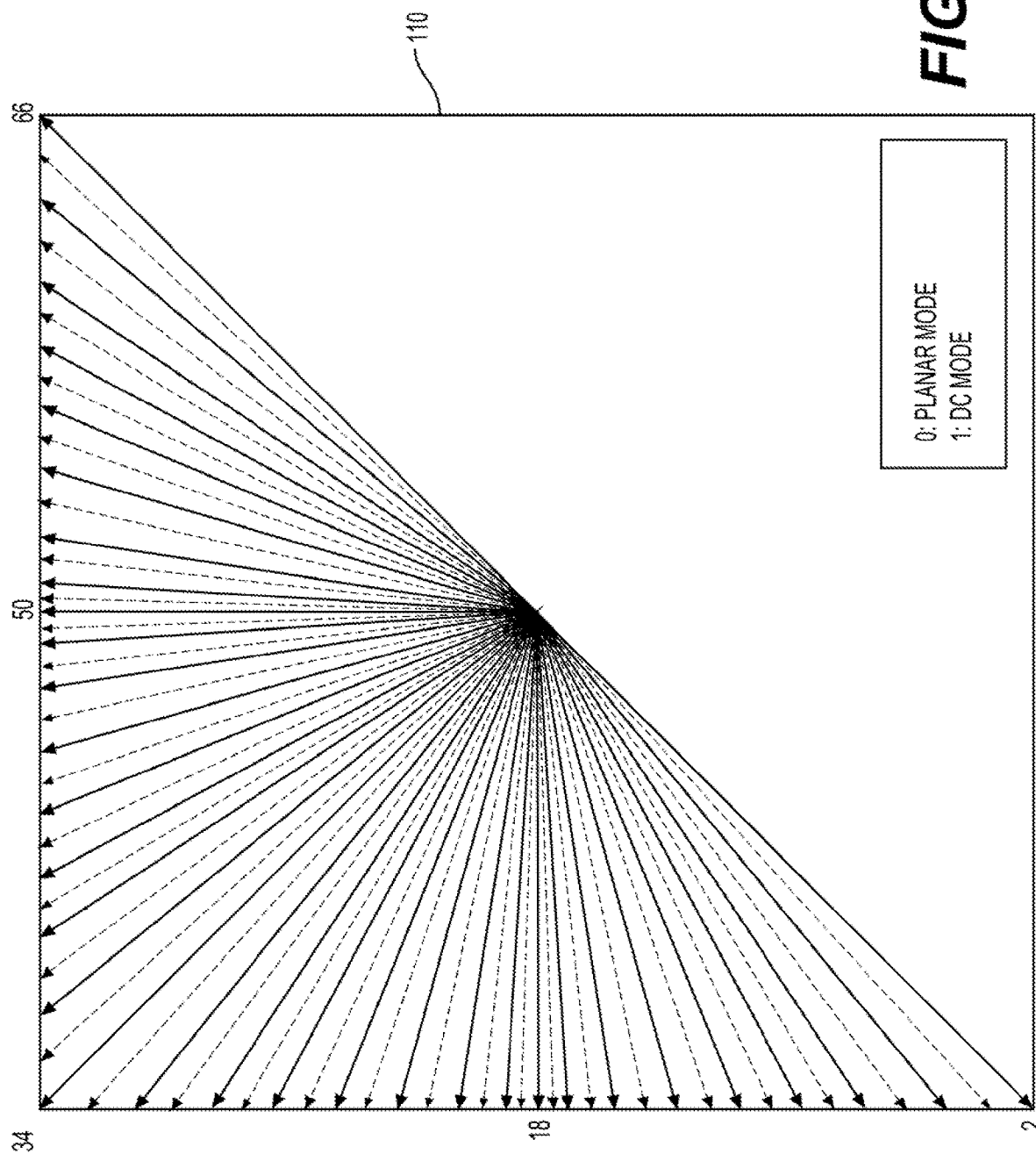
FIG. 1B is an illustration of exemplary intra prediction directions.
Figure 2:
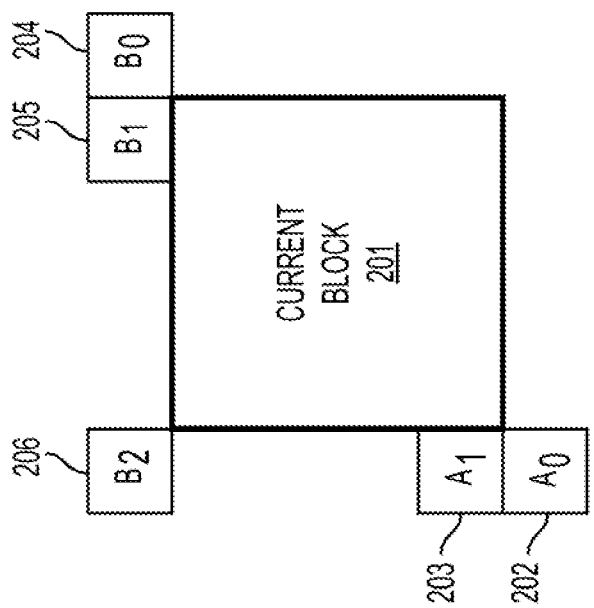
FIG. 2 shows a current block (201) and surrounding samples in accordance with an embodiment.
Figure 3:
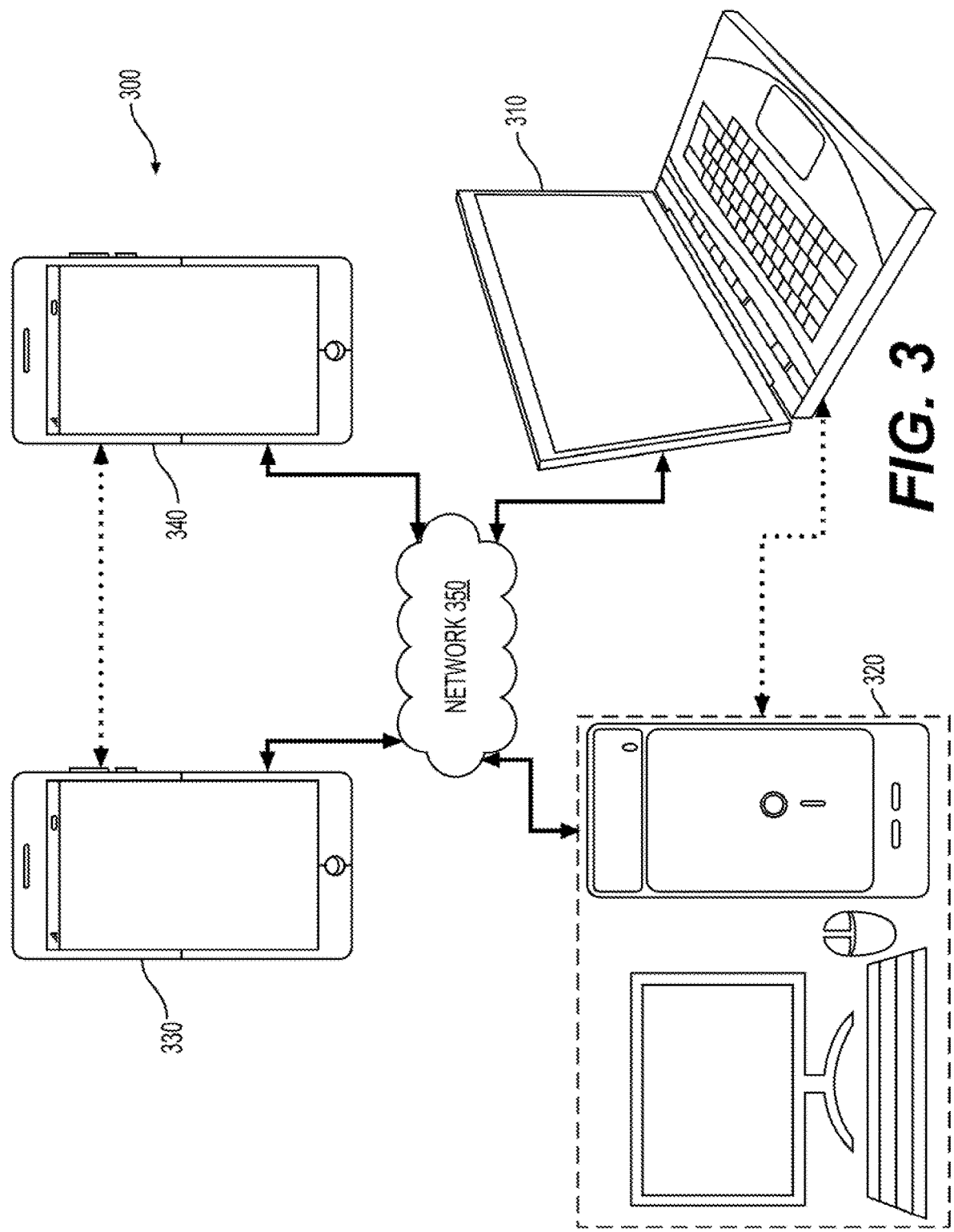
FIG. 3 is a schematic illustration of a simplified block diagram of a communication system (300) in accordance with an embodiment.

FIG. 3 illustrates a simplified block diagram of a communication system (300) according to an embodiment of the present disclosure. The communication system (300) includes a plurality of terminal devices that can communicate with each other, via, for example, a network (350). For example, the communication system (300) includes a first pair of terminal devices (310) and (320) interconnected via the network (350). In the FIG. 3 example, the first pair of terminal devices (310) and (320) performs unidirectional transmission of data. For example, the terminal device (310) may code video data (e.g., a stream of video pictures that are captured by the terminal device (310)) for transmission to the other terminal device (320) via the network (350). The encoded video data can be transmitted in the form of one or more coded video bitstreams. The terminal device (320) may receive the coded video data from the network (350), decode the coded video data to recover the video pictures and display video pictures according to the recovered video data. Unidirectional data transmission may be common in media serving applications and the like.

In another example, the communication system (300) includes a second pair of terminal devices (330) and (340) that performs bidirectional transmission of coded video data that may occur, for example, during videoconferencing. For bidirectional transmission of data, in an example, each terminal device of the terminal devices (330) and (340) may code video data (e.g., a stream of video pictures that are captured by the terminal device) for transmission to the other terminal device of the terminal devices (330) and (340) via the network (350). Each terminal device of the terminal devices (330) and (340) also may receive the coded video data transmitted by the other terminal device of the terminal devices (330) and (340), and may decode the coded video data to recover the video pictures and may display video pictures at an accessible display device according to the recovered video data.

In the FIG. 3 example, the terminal devices (310), (320), (330) and (340) may be illustrated as servers, personal computers and smart phones but the principles of the present disclosure may be not so limited. Embodiments of the present disclosure find application with laptop computers, tablet computers, media players and/or dedicated video conferencing equipment. The network (350) represents any number of networks that convey coded video data among the terminal devices (310), (320), (330) and (340), including for example wireline (wired) and/or wireless communication networks. The communication network (350) may exchange data in circuit-switched and/or packet-switched channels. Representative networks include telecommunications networks, local area networks, wide area networks and/or the Internet. For the purposes of the present discussion, the architecture and topology of the network (350) may be immaterial to the operation of the present disclosure unless explained herein below.

Figure 4:
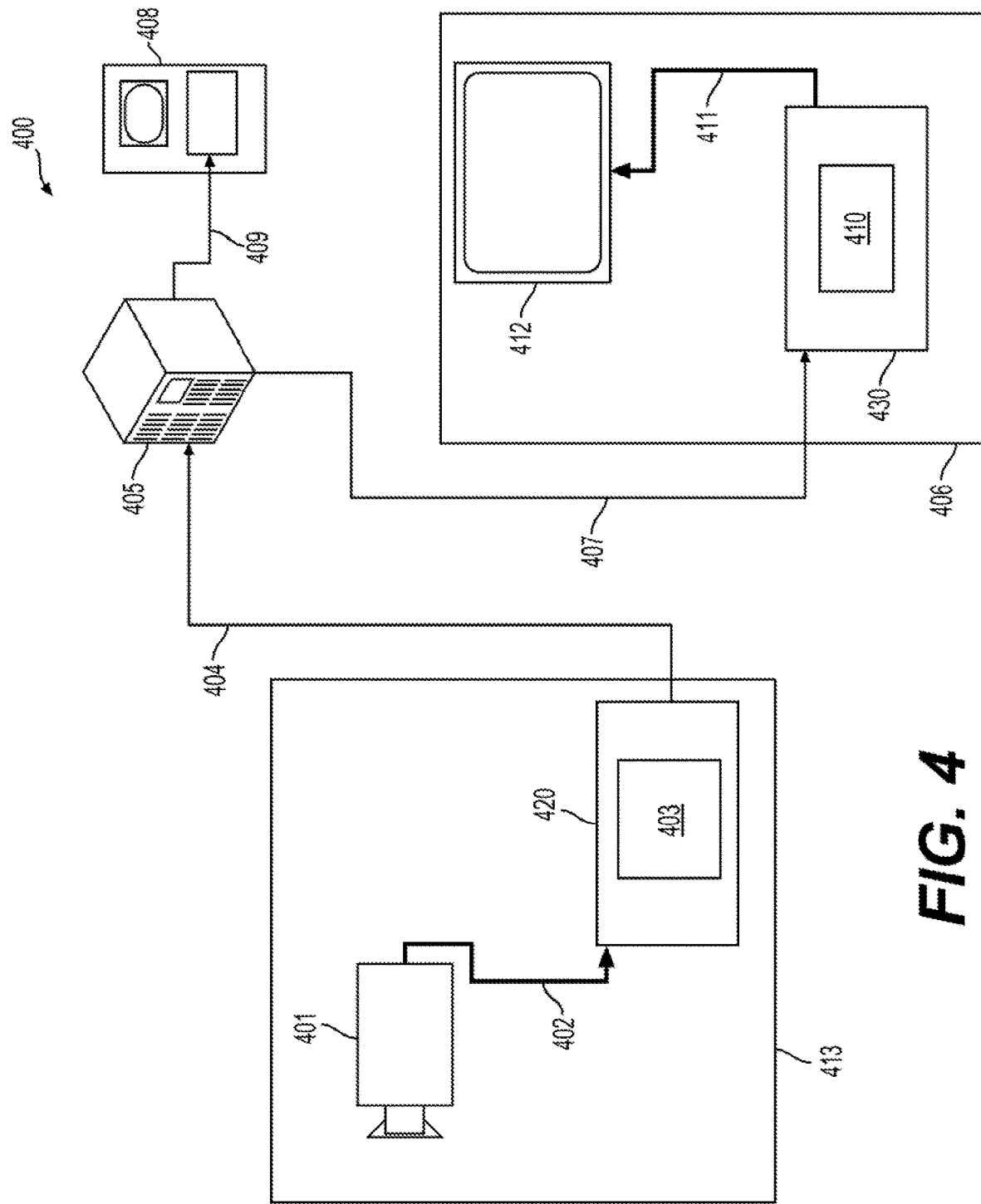
FIG. 4 is a schematic illustration of a simplified block diagram of a communication system (400) in accordance with an embodiment.

FIG. 4 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (413), that can include a video source (401), for example a digital camera, creating for example a stream of video pictures (402) that are uncompressed. In an example, the stream of video pictures (402) includes samples that are taken by the digital camera. The stream of video pictures (402), depicted as a bold line to emphasize a high data volume when compared to encoded video data (404) (or coded video bitstreams), can be processed by an electronic device (420) that includes a video encoder (403) coupled to the video source (401). The video encoder (403) can include hardware, software, or a combination thereof to enable or implement aspects of the disclosed subject matter as described in more detail below. The encoded video data (404) (or encoded video bitstream (404)), depicted as a thin line to emphasize the lower data volume when compared to the stream of video pictures (402), can be stored on a streaming server (405) for future use. One or more streaming client subsystems, such as client subsystems (406) and (408) in FIG. 4 can access the streaming server (405) to retrieve copies (407) and (409) of the encoded video data (404). A client subsystem (406) can include a video decoder (410), for example, in an electronic device (430). The video decoder (410) decodes the incoming copy (407) of the encoded video data and creates an outgoing stream of video pictures (411) that can be rendered on a display (412) (e.g., display screen) or other rendering device (not depicted). In some streaming systems, the encoded video data (404), (407), and (409) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (420) and (430) can include other components (not shown). For example, the electronic device (420) can include a video decoder (not shown) and the electronic device (430) can include a video encoder (not shown) as well.

Figure 5:
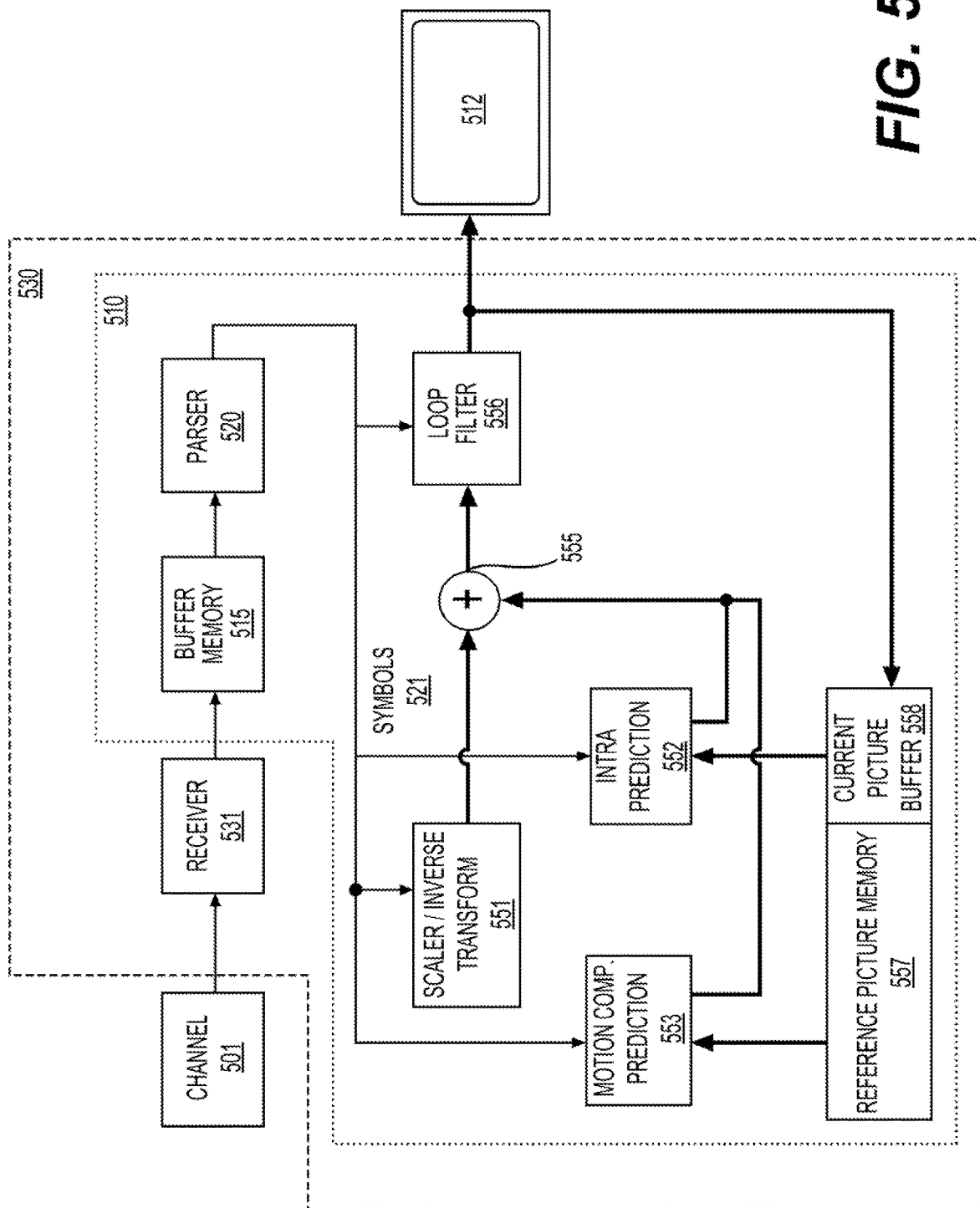
FIG. 5 is a schematic illustration of a simplified block diagram of a decoder in accordance with an embodiment.

FIG. 5 shows a block diagram of a video decoder (510) according to an embodiment of the present disclosure. The video decoder (510) can be included in an electronic device (530). The electronic device (530) can include a receiver (531) (e.g., receiving circuitry). The video decoder (510) can be used in the place of the video decoder (410) in the FIG. 4 example.

The receiver (531) may receive one or more coded video sequences to be decoded by the video decoder (510); in the same or another embodiment, one coded video sequence at a time, where the decoding of each coded video sequence is independent from other coded video sequences. The coded video sequence may be received from a channel (501), which may be a hardware/software link to a storage device which stores the encoded video data. The receiver (531) may receive the encoded video data with other data, for example, coded audio data and/or ancillary data streams, that may be forwarded to their respective using entities (not depicted). The receiver (531) may separate the coded video sequence from the other data. To combat network jitter, a buffer memory (515) may be coupled in between the receiver (531) and an entropy decoder/parser (520) ("parser (520)" henceforth). In certain applications, the buffer memory (515) is part of the video decoder (510). In others, it can be outside of the video decoder (510) (not depicted). In still others, there can be a buffer memory (not depicted) outside of the video decoder (510), for example to combat network jitter, and in addition another buffer memory (515) inside the video decoder (510), for example to handle playout timing. When the receiver (531) is receiving data from a store/forward device of sufficient bandwidth and controllability, or from an isosynchronous network, the buffer memory (515) may not be needed, or can be small. For use on best effort packet networks such as the Internet, the buffer memory (515) may be required, can be comparatively large and can be advantageously of adaptive size, and may at least partially be implemented in an operating system or similar elements (not depicted) outside of the video decoder (510).

The video decoder (510) may include the parser (520) to reconstruct symbols (521) from the coded video sequence. Categories of those symbols include information used to manage operation of the video decoder (510), and potentially information to control a rendering device such as a render device (512) (e.g., a display screen) that is not an integral part of the electronic device (530) but can be coupled to the electronic device (530), as was shown in FIG. 5. The control information for the rendering device(s) may be in the form of Supplemental Enhancement Information (SEI messages) or Video Usability Information (VUI) parameter set fragments (not depicted). The parser (520) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (520) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (520) may also extract from the coded video sequence information such as transform coefficients, quantizer parameter values, motion vectors, and so forth.

The parser (520) may perform an entropy decoding/parsing operation on the video sequence received from the buffer memory (515), so as to create symbols (521).

Reconstruction of the symbols (521) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (520). The flow of such subgroup control information between the parser (520) and the multiple units below is not depicted for clarity.

Beyond the functional blocks already mentioned, the video decoder (510) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (551). The scaler/inverse transform unit (551) receives a quantized transform coefficient as well as control information, including which transform to use, block size, quantization factor, quantization scaling matrices, etc. as symbol(s) (521) from the parser (520). The scaler/inverse transform unit (551) can output blocks comprising sample values, that can be input into aggregator (555).

In some cases, the output samples of the scaler/inverse transform (551) can pertain to an intra coded block; that is: a block that is not using predictive information from previously reconstructed pictures, but can use predictive information from previously reconstructed parts of the current picture. Such predictive information can be provided by an intra picture prediction unit (552). In some cases, the intra picture prediction unit (552) generates a block of the same size and shape of the block under reconstruction, using surrounding already reconstructed information fetched from the current picture buffer (558). The current picture buffer (558) buffers, for example, partly reconstructed current picture and/or fully reconstructed current picture. The aggregator (555), in some cases, adds, on a per sample basis, the prediction information the intra prediction unit (552) has generated to the output sample information as provided by the scaler/inverse transform unit (551).

In other cases, the output samples of the scaler/inverse transform unit (551) can pertain to an inter coded, and potentially motion compensated block. In such a case, a motion compensation prediction unit (553) can access reference picture memory (557) to fetch samples used for prediction. After motion compensating the fetched samples in accordance with the symbols (521) pertaining to the block, these samples can be added by the aggregator (555) to the output of the scaler/inverse transform unit (551) (in this case called the residual samples or residual signal) so as to generate output sample information. The addresses within the reference picture memory (557) from where the motion compensation prediction unit (553) fetches prediction samples can be controlled by motion vectors, available to the motion compensation prediction unit (553) in the form of symbols (521) that can have, for example X, Y, and reference picture components. Motion compensation also can include interpolation of sample values as fetched from the reference picture memory (557) when sub-sample exact motion vectors are in use, motion vector prediction mechanisms, and so forth.

The output samples of the aggregator (555) can be subject to various loop filtering techniques in the loop filter unit (556). Video compression technologies can include in-loop filter technologies that are controlled by parameters included in the coded video sequence (also referred to as coded video bitstream) and made available to the loop filter unit (556) as symbols (521) from the parser (520), but can also be responsive to meta-information obtained during the decoding of previous (in decoding order) parts of the coded picture or coded video sequence, as well as responsive to previously reconstructed and loop-filtered sample values.

The output of the loop filter unit (556) can be a sample stream that can be output to the render device (512) as well as stored in the reference picture memory (557) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (520)), the current picture buffer (558) can become a part of the reference picture memory (557), and a fresh current picture buffer can be reallocated before commencing the reconstruction of the following coded picture.

The video decoder (510) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (531) may receive additional (redundant) data with the encoded video. The additional data may be included as part of the coded video sequence(s). The additional data may be used by the video decoder (510) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 6:
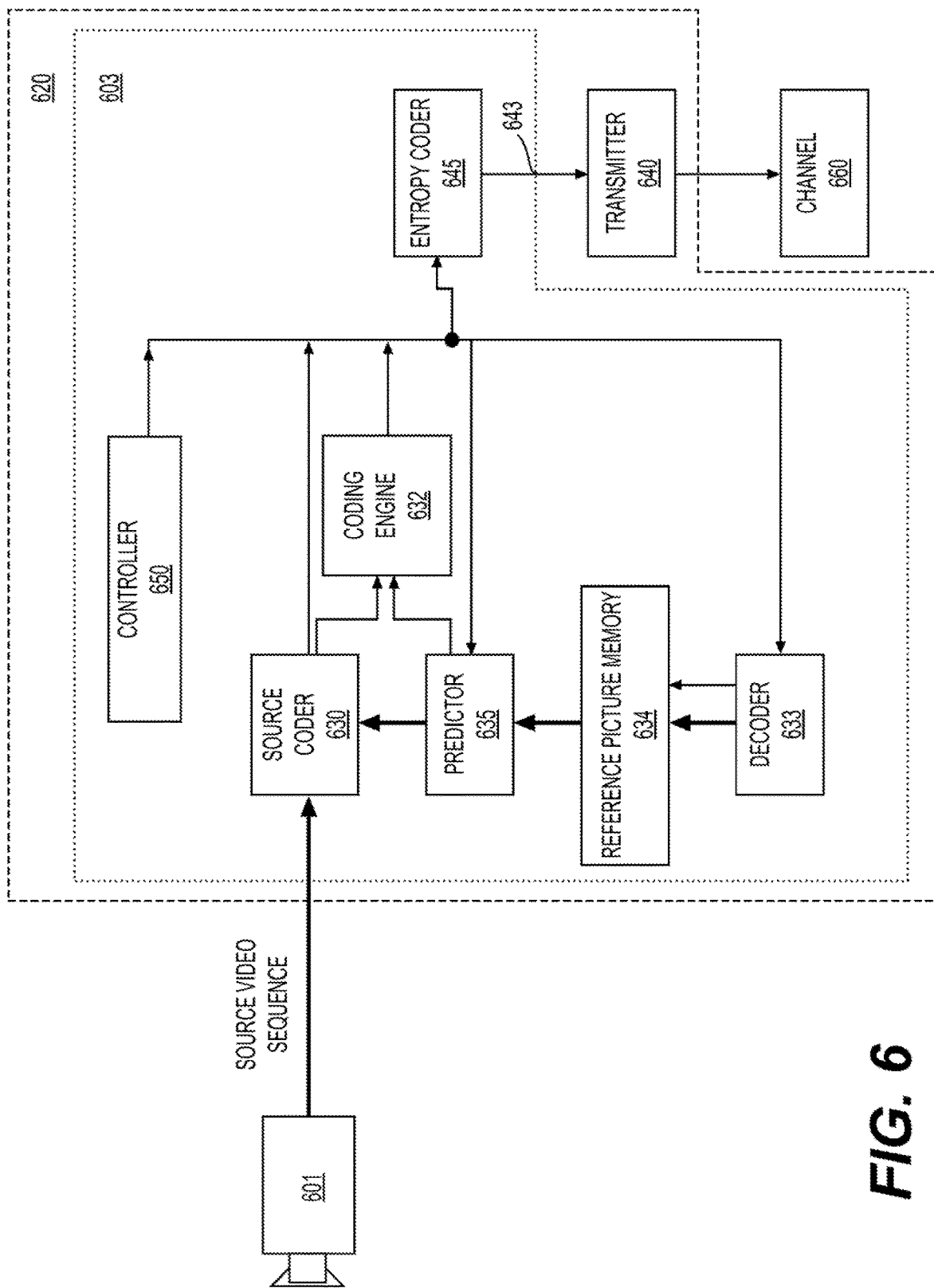
FIG. 6 is a schematic illustration of a simplified block diagram of an encoder in accordance with an embodiment.

FIG. 6 shows a block diagram of a video encoder (603) according to an embodiment of the present disclosure. The video encoder (603) is included in an electronic device (620). The electronic device (620) includes a transmitter (640) (e.g., transmitting circuitry). The video encoder (603) can be used in the place of the video encoder (403) in the FIG. 4 example.

The video encoder (603) may receive video samples from a video source (601) (that is not part of the electronic device (620) in the FIG. 6 example) that may capture video image(s) to be coded by the video encoder (603). In another example, the video source (601) is a part of the electronic device (620).

The video source (601) may provide the source video sequence to be coded by the video encoder (603) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (601) may be a storage device storing previously prepared video. In a videoconferencing system, the video source (601) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (603) may code and compress the pictures of the source video sequence into a coded video sequence (643) in real time or under any other time constraints as required by the application. Enforcing appropriate coding speed is one function of a controller (650). In some embodiments, the controller (650) controls other functional units as described below and is functionally coupled to the other functional units. The coupling is not depicted for clarity. Parameters set by the controller (650) can include rate control related parameters (picture skip, quantizer, lambda value of rate-distortion optimization techniques, . . . ), picture size, group of pictures (GOP) layout, maximum motion vector search range, and so forth. The controller (650) can be configured to have other suitable functions that pertain to the video encoder (603) optimized for a certain system design.

In some embodiments, the video encoder (603) is configured to operate in a coding loop. As an oversimplified description, in an example, the coding loop can include a source coder (630) (e.g., responsible for creating symbols, such as a symbol stream, based on an input picture to be coded, and a reference picture(s)), and a (local) decoder (633) embedded in the video encoder (603). The decoder (633) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (634). As the decoding of a symbol stream leads to bit-exact results independent of decoder location (local or remote), the content in the reference picture memory (634) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (633) can be the same as of a "remote" decoder, such as the video decoder (510), which has already been described in detail above in conjunction with FIG. 5. Briefly referring also to FIG. 5, however, as symbols are available and encoding/decoding of symbols to a coded video sequence by an entropy coder (645) and the parser (520) can be lossless, the entropy decoding parts of the video decoder (510), including the buffer memory (515), and parser (520) may not be fully implemented in the local decoder (633).

In an embodiment, a decoder technology except the parsing/entropy decoding that is present in a decoder is present, in an identical or a substantially identical functional form, in a corresponding encoder. Accordingly, the disclosed subject matter focuses on decoder operation. The description of encoder technologies can be abbreviated as they are the inverse of the comprehensively described decoder technologies. In certain areas a more detail description is provided below.

During operation, in some examples, the source coder (630) may perform motion compensated predictive coding, which codes an input picture predictively with reference to one or more previously coded picture from the video sequence that were designated as "reference pictures." In this manner, the coding engine (632) codes differences between pixel blocks of an input picture and pixel blocks of reference picture(s) that may be selected as prediction reference(s) to the input picture.

The local video decoder (633) may decode coded video data of pictures that may be designated as reference pictures, based on symbols created by the source coder (630). Operations of the coding engine (632) may advantageously be lossy processes. When the coded video data may be decoded at a video decoder (not shown in FIG. 6), the reconstructed video sequence typically may be a replica of the source video sequence with some errors. The local video decoder (633) replicates decoding processes that may be performed by the video decoder on reference pictures and may cause reconstructed reference pictures to be stored in the reference picture cache (634). In this manner, the video encoder (603) may store copies of reconstructed reference pictures locally that have common content as the reconstructed reference pictures that will be obtained by a far-end video decoder (absent transmission errors).

The predictor (635) may perform prediction searches for the coding engine (632). That is, for a new picture to be coded, the predictor (635) may search the reference picture memory (634) for sample data (as candidate reference pixel blocks) or certain metadata such as reference picture motion vectors, block shapes, and so on, that may serve as an appropriate prediction reference for the new pictures. The predictor (635) may operate on a sample block-by-pixel block basis to find appropriate prediction references. In some cases, as determined by search results obtained by the predictor (635), an input picture may have prediction references drawn from multiple reference pictures stored in the reference picture memory (634).

The controller (650) may manage coding operations of the source coder (630), including, for example, setting of parameters and subgroup parameters used for encoding the video data.

Output of all aforementioned functional units may be subjected to entropy coding in the entropy coder (645). The entropy coder (645) translates the symbols as generated by the various functional units into a coded video sequence, by lossless compressing the symbols according to technologies such as Huffman coding, variable length coding, arithmetic coding, and so forth.

The transmitter (640) may buffer the coded video sequence(s) as created by the entropy coder (645) to prepare for transmission via a communication channel (660), which may be a hardware/software link to a storage device which would store the encoded video data. The transmitter (640) may merge coded video data from the video coder (603) with other data to be transmitted, for example, coded audio data and/or ancillary data streams (sources not shown).

The controller (650) may manage operation of the video encoder (603). During coding, the controller (650) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (603) may perform coding operations according to a predetermined video coding technology or standard, such as ITU-T Rec. H.265. In its operation, the video encoder (603) may perform various compression operations, including predictive coding operations that exploit temporal and spatial redundancies in the input video sequence. The coded video data, therefore, may conform to a syntax specified by the video coding technology or standard being used.

In an embodiment, the transmitter (640) may transmit additional data with the encoded video. The source coder (630) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 7:
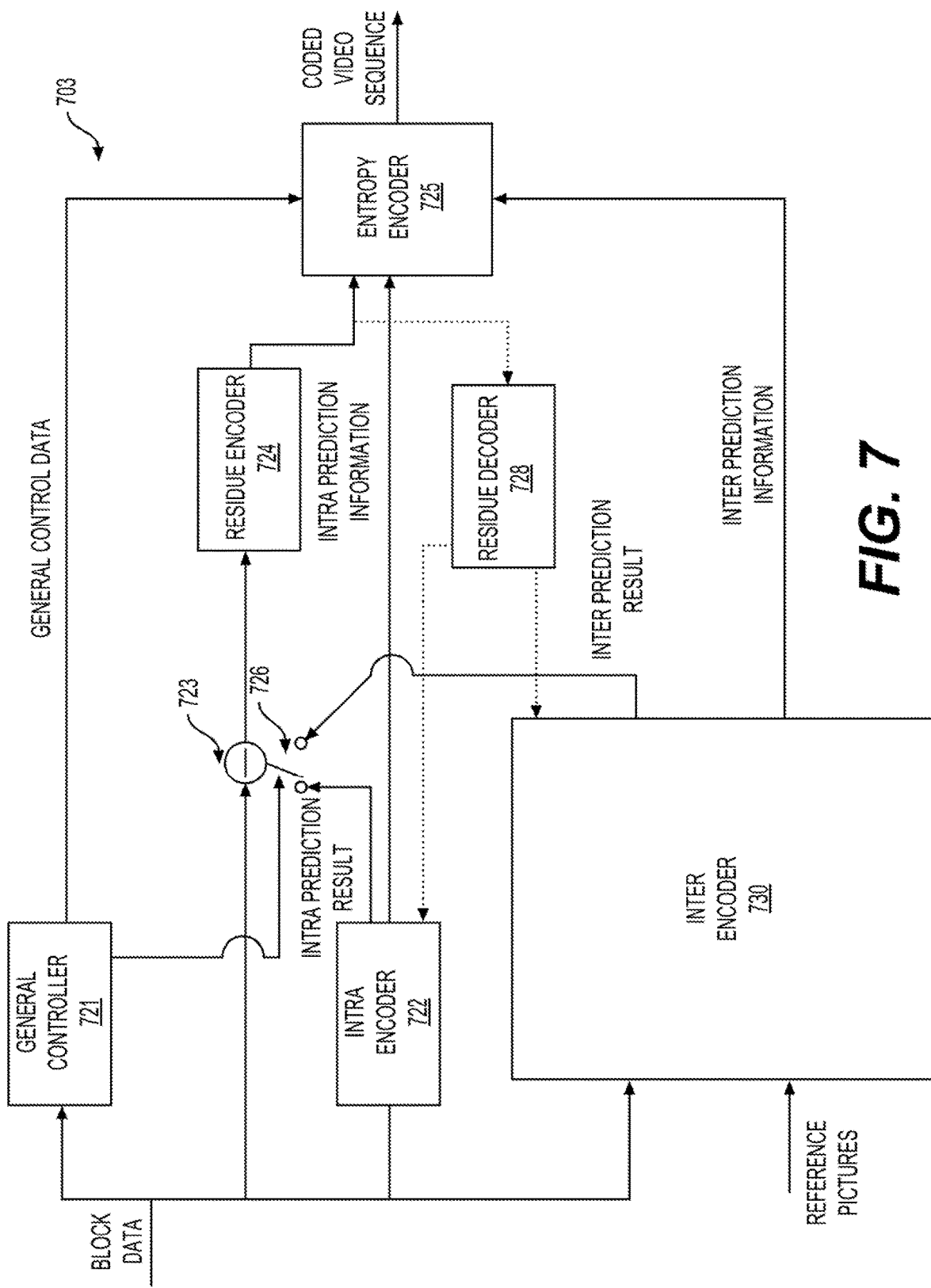
FIG. 7 shows a block diagram of an encoder in accordance with another embodiment.

FIG. 7 shows a diagram of a video encoder (703) according to another embodiment of the disclosure. The video encoder (703) is configured to receive a processing block (e.g., a prediction block) of sample values within a current video picture in a sequence of video pictures, and encode the processing block into a coded picture that is part of a coded video sequence. In an example, the video encoder (703) is used in the place of the video encoder (403) in the FIG. 4 example.

In an HEVC example, the video encoder (703) receives a matrix of sample values for a processing block, such as a prediction block of 8×8 samples, and the like. The video encoder (703) determines whether the processing block is best coded using intra mode, inter mode, or bi-prediction mode using, for example, rate-distortion optimization. When the processing block is to be coded in intra mode, the video encoder (703) may use an intra prediction technique to encode the processing block into the coded picture; and when the processing block is to be coded in inter mode or bi-prediction mode, the video encoder (703) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (703) includes other components, such as a mode decision module (not shown) to determine the mode of the processing blocks.

In the FIG. 7 example, the video encoder (703) includes the inter encoder (730), an intra encoder (722), a residue calculator (723), a switch (726), a residue encoder (724), a general controller (721), and an entropy encoder (725) coupled together as shown in FIG. 7.

The inter encoder (730) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (722) is configured to receive the samples of the current block (e.g., a processing block), in some cases compare the block to blocks already coded in the same picture, generate quantized coefficients after transform, and in some cases also intra prediction information (e.g., an intra prediction direction information according to one or more intra encoding techniques). In an example, the intra encoder (722) also calculates intra prediction results (e.g., predicted block) based on the intra prediction information and reference blocks in the same picture.

The general controller (721) is configured to determine general control data and control other components of the video encoder (703) based on the general control data. In an example, the general controller (721) determines the mode of the block, and provides a control signal to the switch (726) based on the mode. For example, when the mode is the intra mode, the general controller (721) controls the switch (726) to select the intra mode result for use by the residue calculator (723), and controls the entropy encoder (725) to select the intra prediction information and include the intra prediction information in the bitstream; and when the mode is the inter mode, the general controller (721) controls the switch (726) to select the inter prediction result for use by the residue calculator (723), and controls the entropy encoder (725) to select the inter prediction information and include the inter prediction information in the bitstream.

The residue calculator (723) is configured to calculate a difference (residue data) between the received block and prediction results selected from the intra encoder (722) or the inter encoder (730). The residue encoder (724) is configured to operate based on the residue data to encode the residue data to generate the transform coefficients. In an example, the residue encoder (724) is configured to convert the residue data from a spatial domain to a frequency domain, and generate the transform coefficients. The transform coefficients are then subject to quantization processing to obtain quantized transform coefficients. In various embodiments, the video encoder (703) also includes a residue decoder (728). The residue decoder (728) is configured to perform inverse-transform, and generate the decoded residue data. The decoded residue data can be suitably used by the intra encoder (722) and the inter encoder (730). For example, the inter encoder (730) can generate decoded blocks based on the decoded residue data and inter prediction information, and the intra encoder (722) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (725) is configured to format the bitstream to include the encoded block. The entropy encoder (725) is configured to include various information according to a suitable standard, such as the HEVC standard. In an example, the entropy encoder (725) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 8:
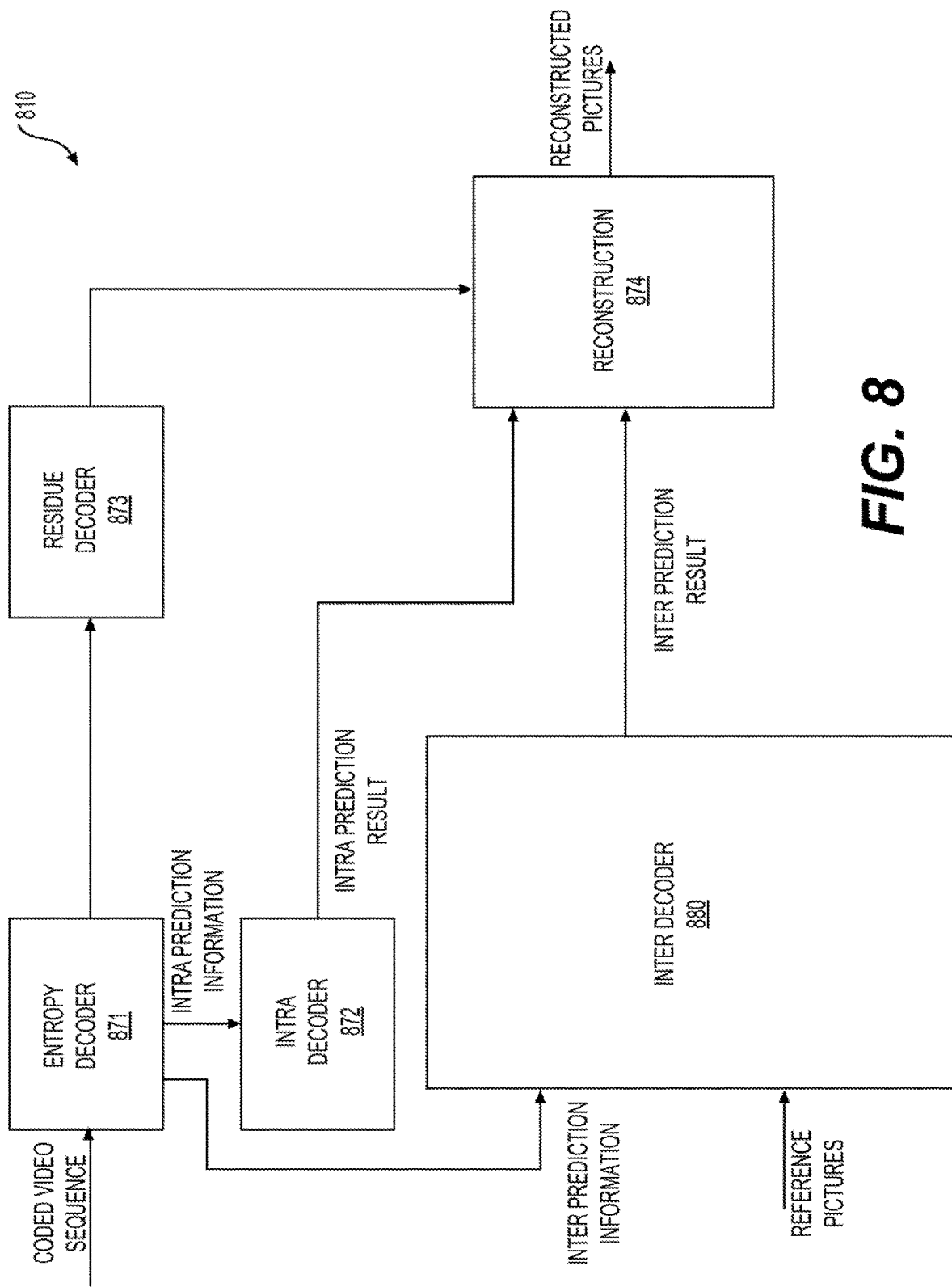
FIG. 8 shows a block diagram of a decoder in accordance with another embodiment.

FIG. 8 shows a diagram of a video decoder (810) according to another embodiment of the disclosure. The video decoder (810) is configured to receive coded pictures that are part of a coded video sequence, and decode the coded pictures to generate reconstructed pictures. In an example, the video decoder (810) is used in the place of the video decoder (410) in the FIG. 4 example.

In the FIG. 8 example, the video decoder (810) includes an entropy decoder (871), an inter decoder (880), a residue decoder (873), a reconstruction module (874), and an intra decoder (872) coupled together as shown in FIG. 8.

The entropy decoder (871) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (872) or the inter decoder (880), respectively, residual information in the form of, for example, quantized transform coefficients, and the like. In an example, when the prediction mode is inter or bi-predicted mode, the inter prediction information is provided to the inter decoder (880); and when the prediction type is the intra prediction type, the intra prediction information is provided to the intra decoder (872). The residual information can be subject to inverse quantization and is provided to the residue decoder (873).

The inter decoder (880) is configured to receive the inter prediction information, and generate inter prediction results based on the inter prediction information.

The intra decoder (872) is configured to receive the intra prediction information, and generate prediction results based on the intra prediction information.

The residue decoder (873) is configured to perform inverse quantization to extract de-quantized transform coefficients, and process the de-quantized transform coefficients to convert the residual from the frequency domain to the spatial domain. The residue decoder (873) may also require certain control information (to include the Quantizer Parameter (QP)), and that information may be provided by the entropy decoder (871) (data path not depicted as this may be low volume control information only).

The reconstruction module (874) is configured to combine, in the spatial domain, the residual as output by the residue decoder (873) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (403), (603), and (703), and the video decoders (410), (510), and (810) can be implemented using any suitable technique. In an embodiment, the video encoders (403), (603), and (703), and the video decoders (410), (510), and (810) can be implemented using one or more integrated circuits. In another embodiment, the video encoders (403), (603), and (603), and the video decoders (410), (510), and (810) can be implemented using one or more processors that execute software instructions.

II. Video Coding Based on Neural Networks

This disclosure describes video coding technologies related to neural image compression technologies and/or neural video compression technologies, such as artificial intelligence (AI) based neural image compression (NIC). Aspects of the disclosure include content-adaptive online training in NIC, such as NIC methods for an end-to-end (E2E) optimized image coding framework based on neural networks. A neural network (NN) can include an artificial neural network (ANN), such as a deep neural network (DNN), a convolution neural network (CNN), or the like.

In an embodiment, a related hybrid video codec is difficult to be optimized as a whole. For example, an improvement of a single module (e.g., an encoder) in the hybrid video codec may not result in a coding gain in the overall performance. In a NN-based video coding framework, different modules can be jointly optimized from an input to an output to improve a final objective (e.g., rate-distortion performance, such as a rate-distortion loss L described in the disclosure) by performing a learning process or a training process (e.g., a machine learning process), and thus resulting in an E2E optimized NIC.

An exemplary NIC framework or system can be described as follows. The NIC framework can use an input image x as an input to a neural network encoder (e.g., an encoder based on neural networks such as DNNs) to compute a compressed representation (e.g., a compact representation) $\hat{x}$ that can be compact, for example, for storage and transmission purposes. A neural network decoder (e.g., a decoder based on neural networks such as DNNs) can use the compressed representation $\hat{x}$ as an input to reconstruct an output image (also referred to as a reconstructed image) $\bar{x}$. In various embodiments, the input image x and reconstructed image $\bar{x}$ are in a spatial domain and the compressed representation $\hat{x}$ is in a domain different from the spatial domain. In some examples, the compressed representation $\hat{x}$ is quantized and entropy coded.

In some examples, a NIC framework can use a variational autoencoder (VAE) structure. In the VAE structure, the neural network encoder can directly use the entire input image x as the input to the neural network encoder. The entire input image x can pass through a set of neural network layers that work as a black box to compute the compressed representation $\hat{x}$. The compressed representation $\hat{x}$ is an output of the neural network encoder. The neural network decoder can take the entire compressed representation $\hat{x}$ as an input. The compressed representation $\hat{x}$ can pass through another set of neural network layers that work as another black box to compute the reconstructed image $\bar{x}$. A rate-distortion (R-D) loss L (x, $\bar{x}$, $\hat{x}$) can be optimized to achieve a trade-off between a distortion loss D (x, $\bar{x}$) of the reconstructed image $\bar{x}$ and bit consumption R of the compact representation $\hat{x}$ with a trade-off hyperparameter λ.

$$L(x, \bar{x}, \hat{x}) = \lambda D(x, \bar{x}) + R(\hat{x}) \qquad \text{Eq. 1}$$

A neural network (e.g., an ANN) can learn to perform tasks from examples, without task-specific programming. An ANN can be configured with connected nodes or artificial neurons. A connection between nodes can transmit a signal from a first node to a second node (e.g., a receiving node), and the signal can be modified by a weight which can be indicated by a weight coefficient for the connection. The receiving node can process signal(s) (i.e., input signal(s) for the receiving node) from node(s) that transmit the signal(s) to the receiving node and then generate an output signal by applying a function to the input signals. The function can be a linear function. In an example, the output signal is a weighted summation of the input signal(s). In an example, the output signal is further modified by a bias which can be indicated by a bias term, and thus the output signal is a sum of the bias and the weighted summation of the input signal(s). The function can include a nonlinear operation, for example, on the weighted sum or the sum of the bias and the weighted summation of the input signal(s). The output signal can be sent to node(s) (downstream node(s)) connected to the receiving node). The ANN can be represented or configured by parameters (e.g., weights of the connections and/or biases). The weights and/or the biases can be obtained by training the ANN with examples where the weights and/or the biases can be iteratively adjusted. The trained ANN configured with the determined weights and/or the determined biases can be used to perform tasks.

Nodes in an ANN can be organized in any suitable architecture. In various embodiments, nodes in an ANN are organized in layers including an input layer that receives input signal(s) to the ANN and an output layer that outputs output signal(s) from the ANN. In an embodiment, the ANN further includes layer(s) such as hidden layer(s) between the input layer and the output layer. Different layers may perform different kinds of transformations on respective inputs of the different layers. Signals can travel from the input layer to the output layer.

An ANN with multiple layers between an input layer and an output layer can be referred to as a DNN. In an embodiment, a DNN is a feedforward network where data flows from the input layer to the output layer without looping back. In an example, a DNN is a fully connected network where each node in one layer is connected to all nodes in the next layer. In an embodiment, a DNN is a recurrent neural network (RNN) where data can flow in any direction. In an embodiment, a DNN is a CNN.

A CNN can include an input layer, an output layer, and hidden layer(s) between the input layer and the output layer. The hidden layer(s) can include convolutional layer(s) (e.g., used in an encoder) that perform convolutions, such as a two-dimensional (2D) convolution. In an embodiment, a 2D convolution performed in a convolution layer is between a convolution kernel (also referred to as a filter or a channel, such as a 5×5 matrix) and an input signal (e.g., a 2D matrix such as a 2D image, a 256×256 matrix) to the convolution layer. In various examples, a dimension of the convolution kernel (e.g., 5×5) is smaller than a dimension of the input signal (e.g., 256×256). Thus, a portion (e.g., a 5×5 area) in the input signal (e.g., a 256×256 matrix) that is covered by the convolution kernel is smaller than an area (e.g., a 256×256 area) of the input signal, and thus can be referred to as a receptive field in the respective node in the next layer.

During the convolution, a dot product of the convolution kernel and the corresponding receptive field in the input signal is calculated. Thus, each element of the convolution kernel is a weight that is applied to a corresponding sample in the receptive field, and thus the convolution kernel includes weights. For example, a convolution kernel represented by a 5×5 matrix has 25 weights. In some examples, a bias is applied to the output signal of the convolution layer, and the output signal is based on a sum of the dot product and the bias.

The convolution kernel can shift along the input signal (e.g., a 2D matrix) by a size referred to as a stride, and thus the convolution operation generates a feature map or an activation map (e.g., another 2D matrix), which in turn contributes to an input of the next layer in the CNN. For example, the input signal is a 2D image having 256×256 samples, a stride is 2 samples (e.g., a stride of 2). For the stride of 2, the convolution kernel shifts along an X direction (e.g., a horizontal direction) and/or a Y direction (e.g., a vertical direction) by 2 samples.

Multiple convolution kernels can be applied in the same convolution layer to the input signal to generate multiple feature maps, respectively, where each feature map can represent a specific feature of the input signal. In general, a convolution layer with N channels (i.e., N convolution kernels), each convolution kernel having M×M samples, and a stride S can be specified as Cony: M×M cN sS. For example, a convolution layer with 192 channels, each convolution kernel having 5×5 samples, and a stride of 2 is specified as Cony: 5×5 c192 s2. The hidden layer(s) can include deconvolutional layer(s) (e.g., used in a decoder) that perform deconvolutions, such as a 2D deconvolution. A deconvolution is an inverse of a convolution. A deconvolution layer with 192 channels, each deconvolution kernel having 5×5 samples, and a stride of 2 is specified as DeConv: 5×5 c192 s2.

In various embodiments, a CNN has the following benefits. A number of learnable parameters (i.e., parameters to be trained) in a CNN can be significantly smaller than a number of learnable parameters in a DNN, such as a feedforward DNN. In the CNN, a relatively large number of nodes can share a same filter (e.g., same weights) and a same bias (if the bias is used), and thus the memory footprint can be reduced because a single bias and a single vector of weights can be used across all receptive fields that share the same filter. For example, for an input signal having 100×100 samples, a convolution layer with a convolution kernel having 5×5 samples has 25 learnable parameters (e.g., weights). If a bias is used, then one channel uses 26 learnable parameters (e.g., 25 weights and one bias). If the convolution layer has N channels, the total learnable parameters is 26×N. On the other hand, for a fully connected a layer in a DNN, 100×100 (i.e., 10000) weights are used for each node in the next layer. If the next layer has L nodes, then the total learnable parameters is 10000×L.

A CNN can further include one or more other layer(s), such as pooling layer(s), fully connected layer(s) that can connect every node in one layer to every node in another layer, normalization layer(s), and/or the like. Layers in a CNN can be arranged in any suitable order and in any suitable architecture (e.g., a feed-forward architecture, a recurrent architecture). In an example, a convolutional layer is followed by other layer(s), such as pooling layer(s), fully connected layer(s), normalization layer(s), and/or the like.

A pooling layer can be used to reduce dimensions of data by combining outputs from a plurality of nodes at one layer into a single node in the next layer. A pooling operation for a pooling layer having a feature map as an input is described below. The description can be suitably adapted to other input signals. The feature map can be divided into sub-regions (e.g., rectangular sub-regions), and features in the respective sub-regions can be independently down-sampled (or pooled) to a single value, for example, by taking an average value in an average pooling or a maximum value in a max pooling.

The pooling layer can perform a pooling, such as a local pooling, a global pooling, a max pooling, an average pooling, and/or the like. A pooling is a form of nonlinear down-sampling. A local pooling combines a small number of nodes (e.g., a local cluster of nodes, such as 2×2 nodes) in the feature map. A global pooling can combine all nodes, for example, of the feature map.

The pooling layer can reduce a size of the representation, and thus reducing a number of parameters, a memory footprint, and an amount of computation in a CNN. In an example, a pooling layer is inserted between successive convolutional layers in a CNN. In an example, a pooling layer is followed by an activation function, such as a rectified linear unit (ReLU) layer. In an example, a pooling layer is omitted between successive convolutional layers in a CNN.

A normalization layer can be an ReLU, a leaky ReLU, a generalized divisive normalization (GDN), an inverse GDN (IGDN), or the like. An ReLU can apply a non-saturating activation function to remove negative values from an input signal, such as a feature map, by setting the negative values to zero. A leaky ReLU can have a small slope (e.g., 0.01) for negative values instead of a flat slope (e.g., 0). Accordingly, if a value x is larger than 0, then an output from the leaky ReLU is x. Otherwise, the output from the leaky ReLU is the value x multiplied by the small slope (e.g., 0.01). In an example, the slope is determined before training, and thus is not learnt during training.

Figure 9:
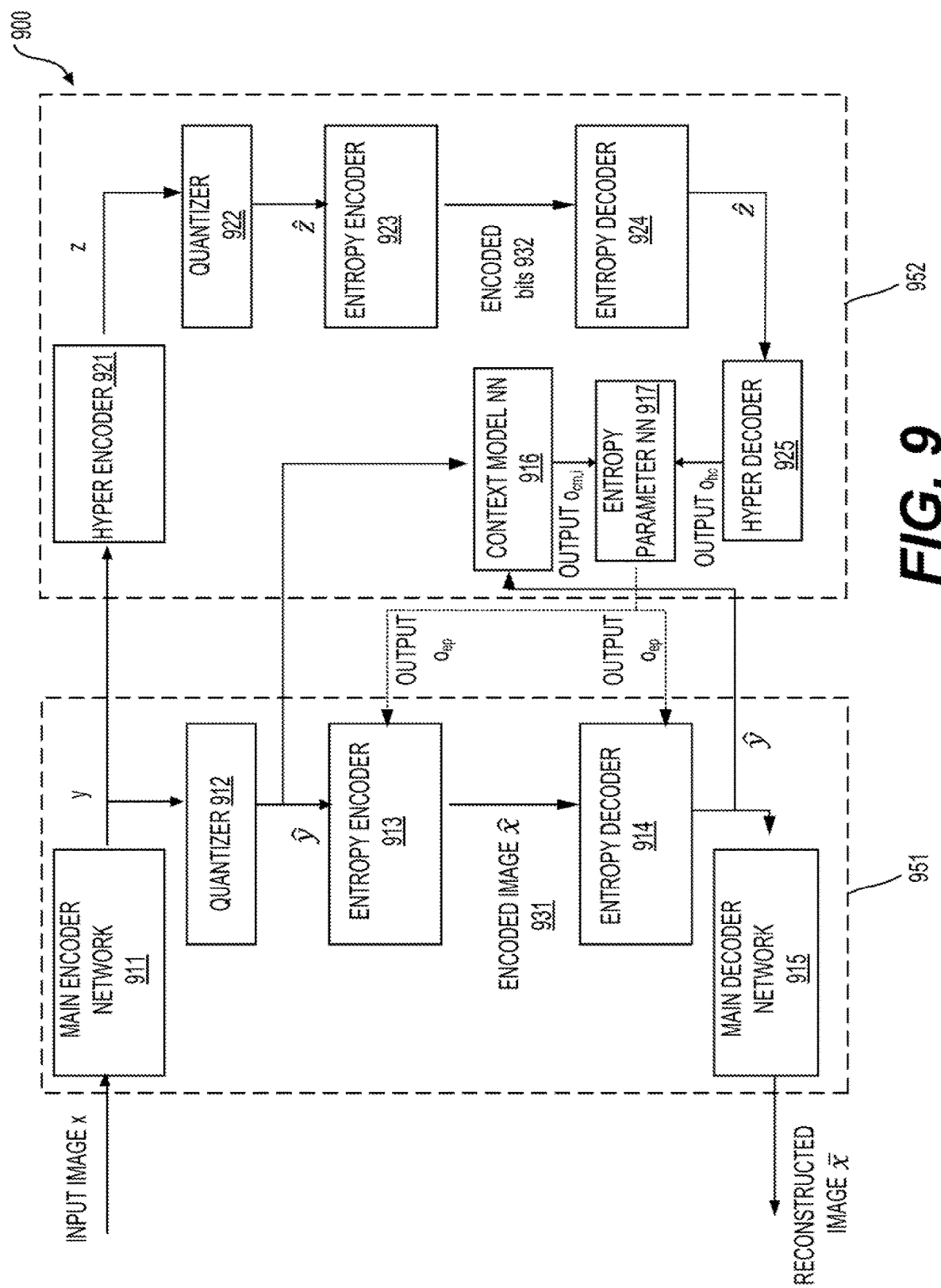
FIG. 9 shows an exemplary NIC framework according to an embodiment of the disclosure.

FIG. 9 shows an exemplary NIC framework (900) (e.g., a NIC system) according to an embodiment of the disclosure. The NIC framework (900) can be based on neural networks, such as DNNs and/or CNNs. The NIC framework (900) can be used to compress (e.g., encode) images and decompress (e.g., decode or reconstruct) compressed images (e.g., encoded images). The NIC framework (900) can include two sub-neural networks, a first sub-NN (951) and a second sub-NN (952) that are implemented using neural networks.

The first sub-NN (951) can resemble an autoencoder and can be trained to generate a compressed image $\hat{x}$ of an input image x and decompress the compressed image $\hat{x}$ to obtain a reconstructed image $\bar{x}$. The first sub-NN (951) can include a plurality of components (or modules), such as a main encoder neural network (or a main encoder network) (911), a quantizer (912), an entropy encoder (913), an entropy decoder (914), and a main decoder neural network (or a main encoder network) (915). Referring to FIG. 9, the main encoder network (911) can generate a latent or a latent representation y from the input image x (e.g., an image to be compressed or encoded). In an example, the main encoder network (911) is implemented using a CNN. A relationship between the latent representation y and the input image x can be described using Eq. 2.

$$y=f_1(x; \theta_1) \qquad \text{Eq. 2}$$

where a parameter $\theta_1$ represents parameters, such as weights used in convolution kernels in the main encoder network (911) and biases (if biases are used in the main encoder network (911)).

The latent representation y can be quantized using the quantizer (912) to generate a quantized latent ŷ. The quantized latent ŷ can be compressed, for example, using lossless compression by the entropy encoder (913) to generate the compressed image (e.g., an encoded image) x̂(931) that is a compressed representation x̂ of the input image x. The entropy encoder (913) can use entropy coding techniques such as Huffman coding, arithmetic coding, or the like. In an example, the entropy encoder (913) uses arithmetic encoding and is an arithmetic encoder. In an example, the encoded image (931) is transmitted in a coded bitstream.

The encoded image (931) can be decompressed (e.g., entropy decoded) by the entropy decoder (914) to generate an output. The entropy decoder (914) can use entropy coding techniques such as Huffman coding, arithmetic coding, or the like that correspond to the entropy encoding techniques used in the entropy encoder (913). In an example, the entropy decoder (914) uses arithmetic decoding and is an arithmetic decoder. In an example, lossless compression is used in the entropy encoder (913), lossless decompression is used in the entropy decoder (914), and noises, such as due to the transmission of the encoded image (931) are omissible, the output from the entropy decoder (914) is the quantized latent ŷ.

The main decoder network (915) can decode the quantized latent ŷ to generate the reconstructed image x̄. In an example, the main decoder network (915) is implemented using a CNN. A relationship between the reconstructed image x̄ (i.e., the output of the main decoder network (915)) and the quantized latent ŷ (i.e., the input of the main decoder network (915)) can be described using Eq. 3.

$$\bar{x}=f_2(\hat{y}; \theta_2) \qquad \text{Eq. 3}$$

where a parameter $\theta_2$ represents parameters, such as weights used in convolution kernels in the main decoder network (915) and biases (if biases are used in the main decoder network (915)). Thus, the first sub-NN (951) can compress (e.g., encode) the input image x to obtain the encoded image (931) and decompress (e.g., decode) the encoded image (931) to obtain the reconstructed image x̄. The reconstructed image x̄ can be different from the input image x due to quantization loss introduced by the quantizer (912).

The second sub-NN (952) can learn the entropy model (e.g., a prior probabilistic model) over the quantized latent ŷ used for entropy coding. Thus, the entropy model can be a conditioned entropy model, e.g., a Gaussian mixture model (GMM), a Gaussian scale model (GSM) that is dependent on the input image x. The second sub-NN (952) can include a context model NN (916), an entropy parameter NN (917), a hyper encoder (921), a quantizer (922), an entropy encoder (923), an entropy decoder (924), and a hyper decoder (925). The entropy model used in the context model NN (916) can be an autoregressive model over latent (e.g., the quantized latent ŷ). In an example, the hyper encoder (921), the quantizer (922), the entropy encoder (923), the entropy decoder (924), and the hyper decoder (925) form a hyper neural network (e.g., a hyperprior NN). The hyper neural network can represent information useful for correcting context-based predictions. Data from the context model NN (916) and the hyper neural network can be combined by the entropy parameter NN (917). The entropy parameter NN (917) can generate parameters, such as mean and scale parameters for the entropy model such as a conditional Gaussian entropy model (e.g., the GMM).

Referring to FIG. 9, at an encoder side, the quantized latent ŷ from the quantizer (912) is fed into the context model NN (916). At a decoder side, the quantized latent ŷ from the entropy decoder (914) is fed into the context model NN (916). The context model NN (916) can be implemented using a neural network, such as a CNN. The context model NN (916) can generate an output $o_{cm,i}$ based on a context $\hat{y}_{<i}$ that is the quantized latent ŷ available to the context model NN (916). The context $\hat{y}_{<i}$ can include previously quantized latent at the encoder side or previously entropy decoded quantized latent at the decoder side. A relationship between the output $o_{cm,i}$ and the input (e.g., $\hat{y}_{<i}$) of the context model NN (916) can be described using Eq. 4.

$$o_{cm,i}=f_3(\hat{y}_{<i}; \theta_3) \qquad \text{Eq. 4}$$

where a parameter $\theta_3$ represents parameters, such as weights used in convolution kernels in the context model NN (916) and biases (if biases are used in the context model NN (916)).

The output $o_{cm,i}$ from the context model NN (916) and an output $o_{hc}$ from the hyper decoder (925) are fed into the entropy parameter NN (917) to generate an output $o_{ep}$. The entropy parameter NN (917) can be implemented using a neural network, such as a CNN. A relationship between the output $o_{ep}$ and the inputs (e.g., $o_{cm,i}$ and $o_{hc}$) of the entropy parameter NN (917) can be described using Eq. 5.

$$o_{ep}=f_4(o_{cm,i}, o_{hc}; \theta_4) \qquad \text{Eq. 5}$$

where a parameter $\theta_4$ represents parameters, such as weights used in convolution kernels in the entropy parameter NN (917) and biases (if biases are used in the entropy parameter NN (917)). The output $o_{ep}$ of the entropy parameter NN (917) can be used in determining (e.g., conditioning) the entropy model, and thus the conditioned entropy model can be dependent on the input image x, for example, via the output $o_{hc}$ from the hyper decoder (925). In an example, the output $o_{ep}$ includes parameters, such as the mean and scale parameters, used to condition the entropy model (e.g., GMM). Referring to FIG. 9, the entropy model (e.g., the conditioned entropy model) can be employed by the entropy encoder (913) and the entropy decoder (914) in entropy coding and entropy decoding, respectively.

The second sub-NN (952) can be described below. The latent y can be fed into the hyper encoder (921) to generate a hyper latent z. In an example, the hyper encoder (921) is implemented using a neural network, such as a CNN. A relationship between the hyper latent z and the latent y can be described using Eq. 6.

$$z=f_5(y; \theta_5) \qquad \text{Eq. 6}$$

where a parameter $\theta_5$ represents parameters, such as weights used in convolution kernels in the hyper encoder (921) and biases (if biases are used in the hyper encoder (921)).

The hyper latent z is quantized by the quantizer (922) to generate a quantized latent ẑ. The quantized latent ẑ can be compressed, for example, using lossless compression by the entropy encoder (923) to generate side information, such as encoded bits (932) from the hyper neural network. The entropy encoder (923) can use entropy coding techniques such as Huffman coding, arithmetic coding, or the like. In an example, the entropy encoder (923) uses arithmetic encoding and is an arithmetic encoder. In an example, the side information, such as the encoded bits (932), can be transmitted in the coded bitstream, for example, together with the encoded image (931).

The side information, such as the encoded bits (932), can be decompressed (e.g., entropy decoded) by the entropy decoder (924) to generate an output. The entropy decoder (924) can use entropy coding techniques such as Huffman coding, arithmetic coding, or the like. In an example, the entropy decoder (924) uses arithmetic decoding and is an arithmetic decoder. In an example, lossless compression is used in the entropy encoder (923), lossless decompression is used in the entropy decoder (924), and noises, such as due to the transmission of the side information are omissible, the output from the entropy decoder (924) can be the quantized latent $\hat{z}$. The hyper decoder (925) can decode the quantized latent $\hat{z}$ to generate the output $o_{hc}$. A relationship between the output $o_{hc}$ and the quantized latent $\hat{z}$ can be described using Eq. 7.

$$o_{hc} = f_6(\hat{z}; \theta_6) \qquad \text{Eq. 7}$$

where a parameter $\theta_6$ represents parameters, such as weights used in convolution kernels in the hyper decoder (925) and biases (if biases are used in the hyper decoder (925)).

As described above, the compressed or encoded bits (932) can be added to the coded bitstream as the side information, which enables the entropy decoder (914) to use the conditional entropy model. Thus, the entropy model can be image-dependent and spatially adaptive, and thus can be more accurate than a fixed entropy model.

The NIC framework (900) can be suitably adapted, for example, to omit one or more components shown in FIG. 9, to modify one or more components shown in FIG. 9, and/or to include one or more components not shown in FIG. 9. In an example, a NIC framework using a fixed entropy model includes the first sub-NN (951), and does not include the second sub-NN (952). In an example, a NIC framework includes the components in the NIC framework (900) except the entropy encoder (923) and the entropy decoder (924).

In an embodiment, one or more components in the NIC framework (900) shown in FIG. 9 are implemented using neural network(s), such as CNN(s). Each NN-based component (e.g., the main encoder network (911), the main decoder network (915), the context model NN (916), the entropy parameter NN (917), the hyper encoder (921), or the hyper decoder (925)) in a NIC framework (e.g., the NIC framework (900)) can include any suitable architecture (e.g., have any suitable combinations of layers), include any suitable types of parameters (e.g., weights, biases, a combination of weights and biases, and/or the like), and include any suitable number of parameters.

In an embodiment, the main encoder network (911), the main decoder network (915), the context model NN (916), the entropy parameter NN (917), the hyper encoder (921), and the hyper decoder (925) are implemented using respective CNNs.

FIG. 10 shows an exemplary CNN of the main encoder network (911) according to an embodiment of the disclosure. For example, the main encoder network (911) includes four sets of layers where each set of layers includes a convolution layer 5×5 c192 s2 followed by a GDN layer.

One or more layers shown in FIG. 10 can be modified and/or omitted. Additional layer(s) can be added to the main encoder network (911).

FIG. 11 shows an exemplary CNN of the main decoder network (915) according to an embodiment of the disclosure. For example, the main decoder network (915) includes three sets of layers where each set of layers includes a deconvolution layer 5×5 c192 s2 followed by an IGDN layer. In addition, the three sets of layers are followed by a deconvolution layer 5×5 c3 s2 followed by an IGDN layer. One or more layers shown in FIG. 11 can be modified and/or omitted. Additional layer(s) can be added to the main decoder network (915).

FIG. 12 shows an exemplary CNN of the hyper encoder (921) according to an embodiment of the disclosure. For example, the hyper encoder (921) includes a convolution layer 3×3 c192 s1 followed by a leaky ReLU, a convolution layer 5×5 c192 s2 followed by a leaky ReLU, and a convolution layer 5×5 c192 s2. One or more layers shown in FIG. 12 can be modified and/or omitted. Additional layer(s) can be added to the hyper encoder (921).

FIG. 13 shows an exemplary CNN of the hyper decoder (925) according to an embodiment of the disclosure. For example, the hyper decoder (925) includes a deconvolution layer 5×5 c192 s2 followed by a leaky ReLU, a deconvolution layer 5×5 c288 s2 followed by a leaky ReLU, and a deconvolution layer 3×3 c384 s1. One or more layers shown in FIG. 13 can be modified and/or omitted. Additional layer(s) can be added to the hyper encoder (925).

FIG. 14 shows an exemplary CNN of the context model NN (916) according to an embodiment of the disclosure. For example, the context model NN (916) includes a masked convolution 5×5 c384 s1 for context prediction, and thus the context $\hat{y}_{<i}$ in Eq. 4 includes a limited context (e.g., a 5×5 convolution kernel). The convolution layer in FIG. 14 can be modified. Additional layer(s) can be added to the context model NN (916).

FIG. 15 shows an exemplary CNN of the entropy parameter NN (917) according to an embodiment of the disclosure. For example, the entropy parameter NN (917) includes a convolution layer 1×1 c640 s1 followed by a leaky ReLU, a convolution layer 1×1 c512 s1 followed by leaky ReLU, and a convolution layer 1×1 c384 s1. One or more layers shown in FIG. 15 can be modified and/or omitted. Additional layer(s) can be added to the entropy parameter NN (917).

The NIC framework (900) can be implemented using CNNs, as described with reference to FIGS. 10-15. The NIC framework (900) can be suitably adapted such that one or more components (e.g., (911), (915), (916), (917), (921), and/or (925)) in the NIC framework (900) are implemented using any suitable types of neural networks (e.g., CNNs or non-CNN based neural networks). One or more other components the NIC framework (900) can be implemented using neural network(s).

The NIC framework (900) that includes neural networks (e.g., CNNs) can be trained to learn the parameters used in the neural networks. For example, when CNNs are used, the parameters represented by $\theta_1$-$\theta_6$, such as the weights used in the convolution kernels in the main encoder network (911) and biases (if biases are used in the main encoder network (911)), the weights used in the convolution kernels in the main decoder network (915) and biases (if biases are used in the main decoder network (915)), the weights used in the convolution kernels in the hyper encoder (921) and biases (if biases are used in the hyper encoder (921)), the weights used in the convolution kernels in the hyper decoder (925) and biases (if biases are used in the hyper decoder (925)), the weights used in the convolution kernel(s) in the context model NN (916) and biases (if biases are used in the context model NN (916)), and the weights used in the convolution kernels in the entropy parameter NN (917) and biases (if biases are used in the entropy parameter NN (917)), respectively, can be learned in the training process.

In an example, referring to FIG. 10, the main encoder network (911) includes four convolution layers where each convolution layer has a convolution kernel of 5×5 and 192 channels. Thus, a number of the weights used in the convolution kernels in the main encoder network (911) is 19200 (i.e., 4×5×5×192). The parameters used in the main encoder network (911) include the 19200 weights and optional biases. Additional parameter(s) can be included when biases and/or additional NN(s) are used in the main encoder network (911).

Referring to FIG. 9, the NIC framework (900) includes at least one component or module built on neural network(s). The at least one component can include one or more of the main encoder network (911), the main decoder network (915), the hyper encoder (921), the hyper decoder (925), the context model NN (916), and the entropy parameter NN (917). The at least one component can be trained individually. In an example, the training process is used to learn the parameters for each component separately. The at least one component can be trained jointly as a group. In an example, the training process is used to learn the parameters for a subset of the at least one component jointly. In an example, the training process is used to learn the parameters for all of the at least one component, and thus is referred to as an E2E optimization.

In the training process for one or more components in the NIC framework (900), the weights (or the weight coefficients) of the one or more components can be initialized. In an example, the weights are initialized based on pre-trained corresponding neural network model(s) (e.g., DNN models, CNN models). In an example, the weights are initialized by setting the weights to random numbers.

A set of training images can be employed to train the one or more components, for example, after the weights are initialized. The set of training images can include any suitable images having any suitable size(s). In some examples, the set of training images includes raw images, natural images, computer-generated images, and/or the like that are in the spatial domain. In some examples, the set of training images includes residue images having residue data in the spatial domain. The residue data can be calculated by a residue calculator (e.g., the residue calculator (723)). In some examples, training images (e.g., raw images and/or residue images including residue data) in the set of training images can be divided into blocks having suitable sizes, and the blocks and/or images can be used to train neural networks in a NIC framework. Thus, raw images, residue images, blocks from raw images, and/or blocks from residue images can be used to train neural networks in a NIC framework.

For purposes of brevity, the training process below is described using a training image as an example. The description can be suitably adapted to a training block. A training image t of the set of training images can be passed through the encoding process in FIG. 9 to generate a compressed representation (e.g., encoded information, for example, to a bitstream). The encoded information can be passed through the decoding process described in FIG. 9 to compute and reconstruct a reconstructed image $\bar{t}$.

For the NIC framework (900), two competing targets, e.g., a reconstruction quality and a bit consumption are balanced. A quality loss function (e.g., a distortion or distortion loss) D (t, $\bar{t}$) can be used to indicate the reconstruction quality, such as a difference between the reconstruction (e.g., the reconstructed image $\bar{t}$) and an original image (e.g., the training image t). A rate (or a rate loss) R can be used to indicate the bit consumption of the compressed representation. In an example, the rate loss R further includes the side information, for example, used in determining a context model.

For neural image compression, differentiable approximations of quantization can be used in E2E optimization. In various examples, in the training process of neural network-based image compression, noise injection (e.g., adding noise) is used to simulate quantization, and thus quantization is simulated by the noise injection instead of being performed by a quantizer (e.g., the quantizer (912)). In an example, a noise injection module can perform noise injection. Thus, training with noise injection can approximate the quantization error variationally. A bits per pixel (BPP) estimator can be used to simulate an entropy coder, and thus entropy coding is simulated by the BPP estimator instead of being performed by an entropy encoder (e.g., (913)) and an entropy decoder (e.g., (914)). Referring to FIG. 9, the NIC framework (900) can be adapted in the training process where noise injection and an estimator to simulate the entropy coder are employed. For example, during the training process, the quantizer (912), the entropy encoder (913), and the entropy decoder (914) can be replaced in the NIC framework (900), for example, by a noise injection module and a BPP estimator, respectively.

Therefore, the rate loss R in the loss function L shown in Eq. 1 during the training process can be estimated, for example, based on the noise injection and the BPP estimator. In general, a higher rate R can allow for a lower distortion D, and a lower rate R can lead to a higher distortion D. Thus, a trade-off hyperparameter $\lambda$ in Eq. 1 can be used to optimize a joint R-D loss L where L as a summation of $\lambda D$ and R can be optimized. The training process can be used to adjust the parameters of the one or more components (e.g., (911), (915)) in the NIC framework (900) such that the joint R-D loss L is minimized or optimized.

Various models can be used to determine the distortion loss D and the rate loss R, and thus to determine the joint R-D loss L in Eq. 1. In an example, the distortion loss D (t, $\bar{t}$) is expressed as a peak signal-to-noise ratio (PSNR) that is a metric based on mean squared error, a multiscale structural similarity (MS-SSIM) quality index, a weighted combination of the PSNR and MS-SSIM, or the like.

In an example, the target of the training process is to train the encoding neural network (e.g., the encoding DNN), such as a video encoder to be used on an encoder side and the decoding neural network (e.g., the decoding DNN), such as a video decoder to be used on a decoder side. In an example, referring to FIG. 9, the encoding neural network can include the main encoder network (911), the hyper encoder (921), the hyper decoder (925), the context model NN (916), and the entropy parameter NN (917). The decoding neural network can include the main decoder network (915), the hyper decoder (925), the context model NN (916), and the entropy parameter NN (917). The video encoder and/or the video decoder can include other component(s) that are based on NN(s) and/or not based on NN(s).

The NIC framework (e.g., the NIC framework (900)) can be trained in an E2E fashion. In an example, the encoding neural network and the decoding neural network are updated jointly in the training process based on backpropagated gradients in an E2E fashion. In an example, the gradients include gradients of the R-D loss with respect to the parameters to be trained (e.g., weights and/or biases) in the NIC framework.

After the parameters of the neural networks in the NIC framework (900) are trained, one or more components in the NIC framework (900) can be used to encode and/or decode images. In an embodiment, on the encoder side, the video encoder is configured to encode the input image x into the encoded image (931) to be transmitted in the bitstream. The video encoder can include multiple components in the NIC framework (900). In an embodiment, on the decoder side, the corresponding video decoder is configured to decode the encoded image (931) in the bitstream into the reconstructed image x̄. The video decoder can include multiple components in the NIC framework (900).

In an example, the video encoder includes all the components in the NIC framework (900), for example, when content-adaptive online training is employed.

Figure 16A:
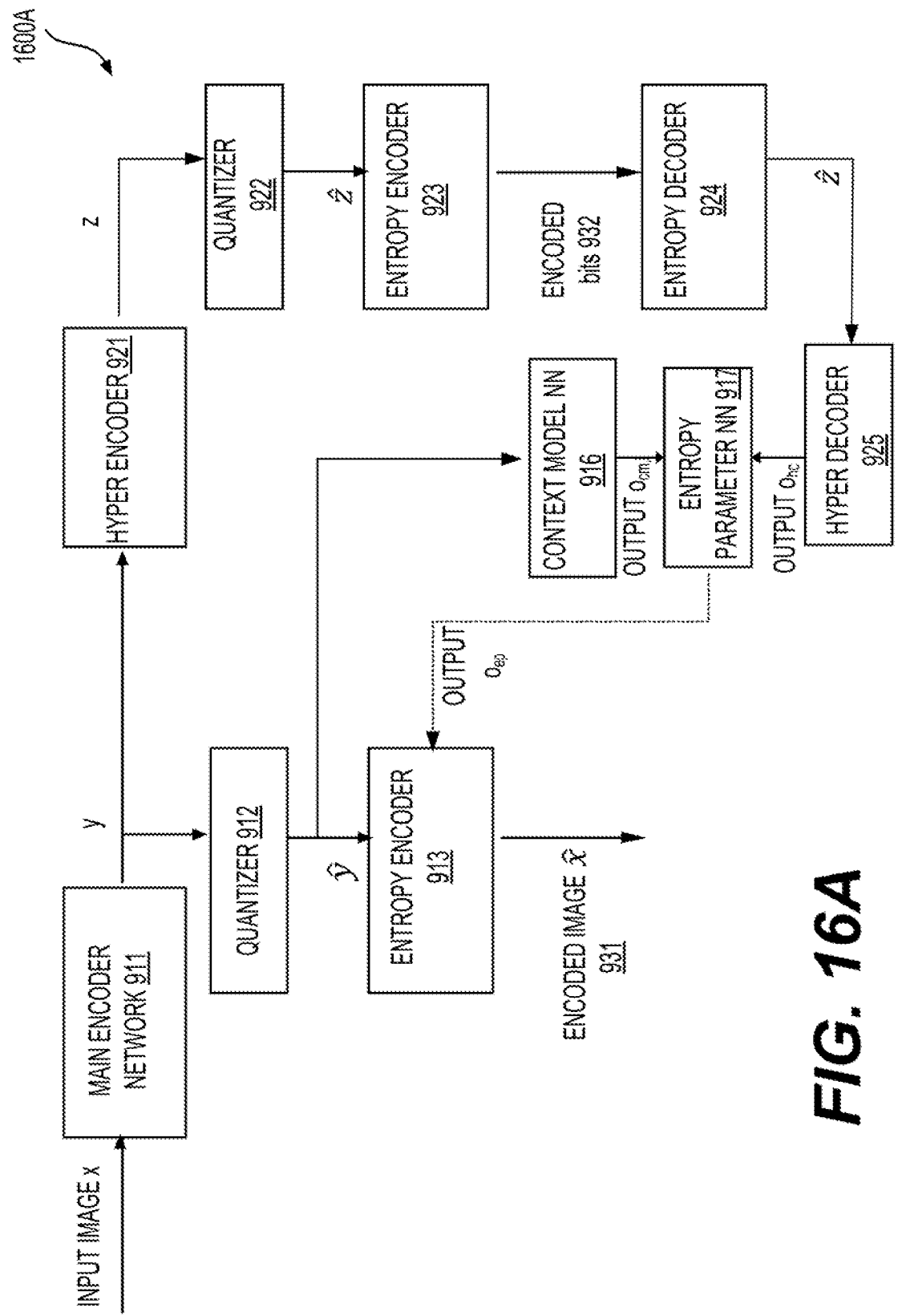
FIG. 16A shows an exemplary video encoder according to an embodiment of the disclosure.
Figure 16B:
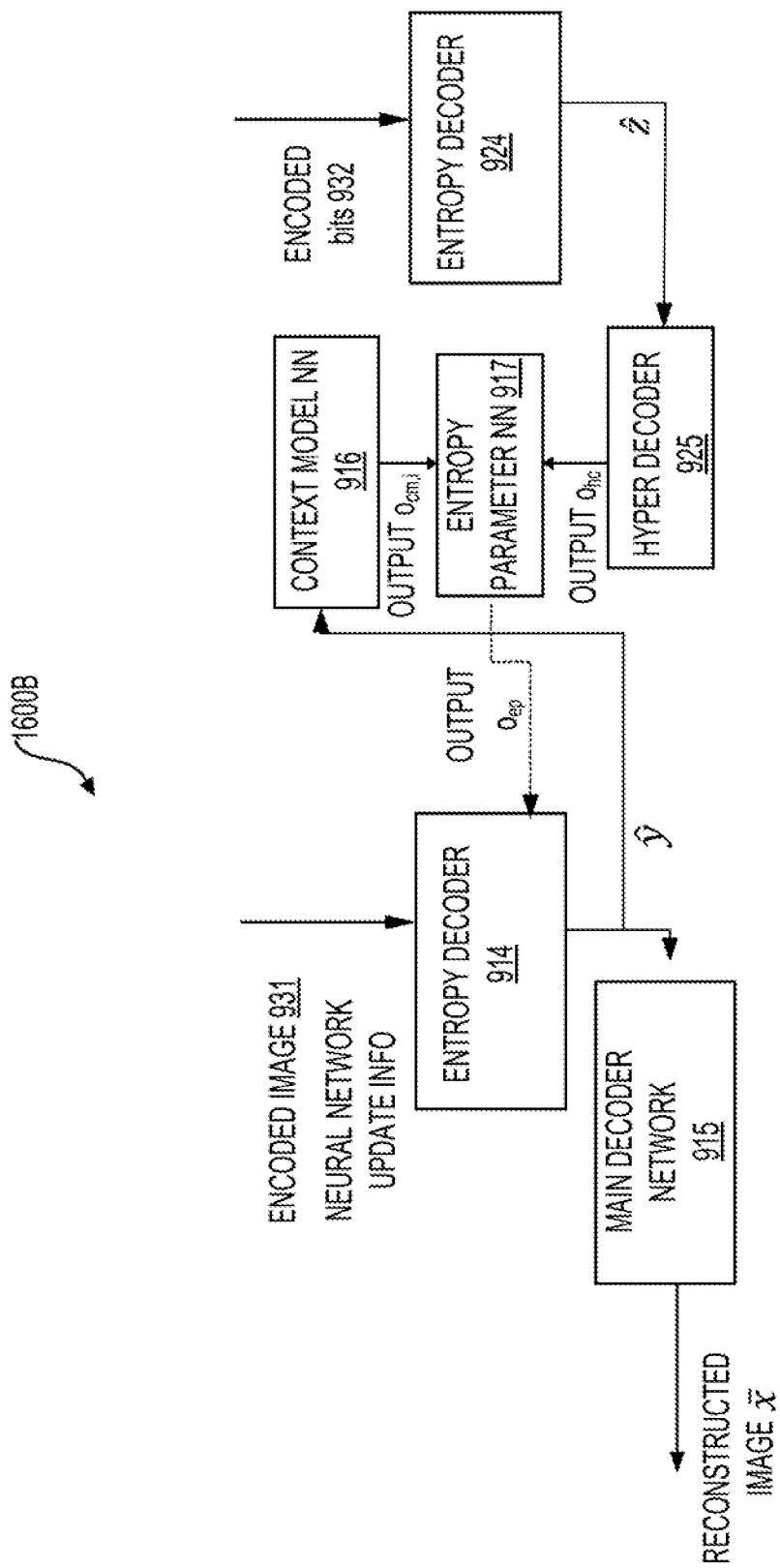
FIG. 16B shows an exemplary video decoder according to an embodiment of the disclosure.

FIG. 16A shows an exemplary video encoder (1600A) according to an embodiment of the disclosure. The video encoder (1600A) includes the main encoder network (911), the quantizer (912), the entropy encoder (913), and the second sub-NN (952) that are described with reference to FIG. 9 and detailed descriptions are omitted for purposes of brevity. FIG. 16B shows an exemplary video decoder (1600B) according to an embodiment of the disclosure. The video decoder (1600B) can correspond to the video encoder (1600A). The video decoder (1600B) can include the main decoder network (915), the entropy decoder (914), the context model NN (916), the entropy parameter NN (917), the entropy decoder (924), and the hyper decoder (925). Referring to FIGS. 16A-16B, on the encoder side, the video encoder (1600A) can generate the encoded image (931) and the encoded bits (932) to be transmitted in the bitstream. On the decoder side, the video decoder (1600B) can receive and decode the encoded image (931) and the encoded bits (932).

FIGS. 17-18 show an exemplary video encoder (1700) and a corresponding video decoder (1800), respectively, according to embodiments of the disclosure. Referring to FIG. 17, the encoder (1700) includes the main encoder network (911), the quantizer (912), and the entropy encoder (913). Examples of the main encoder network (911), the quantizer (912), and the entropy encoder (913) are described with reference to FIG. 9. Referring to FIG. 18, the video decoder (1800) includes the main decoder network (915) and the entropy decoder (914). Examples of the main decoder network (915) and the entropy decoder (914) are described with reference to FIG. 9. Referring to FIGS. 17 and 18, the video encoder (1700) can generate the encoded image (931) to be transmitted in the bitstream. The video decoder (1800) can receive and decode the encoded image (931).

III. Content-Adaptive Online Training in Video Coding

The NIC framework (900) can be based on neural networks, such as CNNs, DNNs, and/or the like. For example, one or more components (e.g., the main encoder network (911)) in the NIC framework (900) can include neural network(s). The neural networks can be specified by parameters, such as weights, biases, and the like.

As described above, the NIC framework (900) including the video encoder and the video decoder can be trained based on images and/or blocks in the set of training images.

In some examples, one or more images to be compressed (e.g., encoded) and/or transmitted have properties that are significantly different from the set of training images. Thus, encoding and decoding the one or more images using the video encoder and the video decoder trained based on the set of training images, respectively, can lead to a relatively poor R-D loss L (e.g., a relatively large distortion and/or a relatively large bit rate). Therefore, aspects of the disclosure describe a content-adaptive online training method for NIC.

In order to differentiate the training process based on the set of training images and the content-adaptive online training process based on the one or more images to be compressed (e.g., encoded) and/or transmitted, the NIC framework (900), the video encoder, and the video decoder that are trained by the set of training images are referred to as the pretrained NIC framework (900), the pretrained video encoder, and the pretrained video decoder, respectively. Parameters in the pretrained NIC framework (900), the pretrained video encoder, or the pretrained video decoder are referred to as NIC pretrained parameters, encoder pretrained parameters, and decoder pretrained parameters, respectively. In an example, the NIC pretrained parameters includes the encoder pretrained parameters and the decoder pretrained parameters. In an example, the encoder pretrained parameters and the decoder pretrained parameters do not overlap where none of the encoder pretrained parameters is included in the decoder pretrained parameters. For example, the encoder pretrained parameters (e.g., pretrained parameters in the main encoder network (911)) in (1700) and the decoder pretrained parameters (e.g., pretrained parameters in the main decoder network (915)) in (1800) do not overlap. In an example, the encoder pretrained parameters and the decoder pretrained parameters overlap where at least one of the encoder pretrained parameters is included in the decoder pretrained parameters. For example, the encoder pretrained parameters (e.g., pretrained parameters in the context model NN (916)) in (1600A) and the decoder pretrained parameters (e.g., the pretrained parameters in the context model NN (916)) in (1600B) overlap. The NIC pretrained parameters can be obtained based on blocks and/or images in the set of training images.

The content-adaptive online training process can be referred to as a finetuning process. In a type I content-adaptive online training process, the content-adaptive online training process described in the disclosure can be implemented to determine (e.g., train) one or more modification parameters, such as scaling factor(s) and/or offset(s). Each of the one or more modification parameters can modify a set of pretrained parameters (e.g., a plurality of pretrained parameters) in the NIC pretrained parameters, such as a set of pretrained weights, a set of pretrained biases, or a set of weights and biases, used in the NIC framework (900). The set of pretrained parameters can be updated using a same method based on the modification parameter. In an example, a modification parameter is a scaling factor that modifies a set of pretrained parameters. Thus, a set of replacement parameters can be generated by multiplying the set of pretrained parameters based on the scaling factor. For example, the set of pretrained parameters can be multiplied with the same scaling factor. The set of pretrained parameters in the NIC framework can be replaced by the set of replacement parameters, respectively, to update the NIC framework.

In a type II content-adaptive online training process, the content-adaptive online training process can be implemented to train (e.g., update) one or more pretrained parameters of the NIC pretrained parameters. The one or more pretrained parameters can include pretrained weight(s) and/or pretrained biases used in the NIC framework (900). When the one or more pretrained parameters include a set of pretrained parameters, the set of pretrained parameters can be updated differently.

In both the type I and type II content-adaptive online training processes, one or more pretrained parameters in the NIC framework can be updated, and thus neural network(s) in the NIC framework and configured with the one or more pretrained parameters are updated. In some examples, such as in the type I content-adaptive online training process, the one or more pretrained parameters in the NIC framework are updated using modification parameter(s) where the modification parameter(s) are trained using a content-adaptive online training process. In some examples, such as in the type II content-adaptive online training process, the one or more pretrained parameters in the NIC framework are updated using a content-adaptive online training process, for example, directly without using a modification parameter.

Examples of the type I and type II content-adaptive online training processes can be described below.

A. Type I Content-Adaptive Online Training

A modification parameter can be determined to modify a set of pretrained parameters based on (i) one or more images to be encoded or (ii) one or more blocks (in an image) to be encoded. The determination process for the modification parameter can also be treated as a finetuning process of the modification parameter. For example, the determination process for a scaling factor can be treated as a finetuning process of the scaling parameter from a "pretrained" scaling parameter (e.g., a scaling parameter of 1 with no modification to the set of pretrained parameters) to the scaling parameter (e.g., 1.1). The training process for an offset can be treated as a finetuning process of the offset from a "pretrained" offset (e.g., an offset of 0 with no modification to the set of pretrained parameters) to the offset (e.g., 0.1).

One or more modification parameters can be used to modify pretrained parameters (e.g., weights and/or biases) in a pretrained NIC framework, and thus modify the pretrained NIC framework. A modification parameter can modify a set of pretrained parameters (e.g., a set of pretrained weights), and thus modify the pretrained NIC framework. A modification parameter can modify element(s) of a convolutional kernel, one or more rows of a convolutional kernel, and/or one or more columns of a convolutional kernel. A modification parameter can be a scaling factor, an offset, and/or the like. A scaling factor can modify a set of pretrained parameters by multiplying the set of pretrained parameters with the scaling factor to obtain a set of replacement parameters. An offset can modify a set of pretrained parameters by adding the offset to the set of pretrained parameters to obtain a set of replacement parameters. The set of replacement parameters can replace the set of pretrained parameters in corresponding neural network(s). The scaling factor can be applied to the offset in some embodiments.

In some examples, using a single modification parameter to modify a relatively larger number of parameters is advantageous when similar changes to the relatively larger number of parameters can result in improvement of coding efficiency.

In some embodiments, one or more modification parameters (e.g., a scaling factor, an offset) can be applied to modify feature map(s) that are output(s) of convolution layer(s). A modification parameter can modify an entire feature map (e.g., a 2D matrix including elements) or a subset of elements in the feature map. A modification parameter can modify one or more elements in a feature map. A modification parameter can modify one or more rows of a feature map. A modification parameter can modify one or more columns of a feature map. A feature map can be modified by one or more modification parameters. A modification parameter can be used to modify one or more feature maps or portions of the feature maps.

In an embodiment, which feature map (e.g., information indicating an NN such as the main decoder network (915), a NN layer, a CNN channel) and/or which portion (e.g., information indicating which elements, rows, and/or columns) of the feature map are modified by the one or more modification parameters are signaled in a bitstream. In an embodiment, which feature map and/or which portion of the feature map are modified by the one or more modification parameters are pre-determined and known to a video decoder, and thus are not signaled.

One or more modification parameters can be determined (e.g., trained or finetuned) based on the one or more images to be encoded and/or transmitted where the one or more images can be different from the set of training images. The one or more modification parameters can be trained by optimizing the joint R-D loss L based on the one or more images. In an embodiment, after the one or more modification parameters have been determined by the training process, neural network update information is encoded into a bitstream to indicate the one or more modification parameters or a subset of the one or more modification parameters. The one or more modification parameters correspond to one or more sets of pretrained parameters where the one or more sets of pretrained parameters are modified by the one or more modification parameters to generate one or more sets of replacement parameters. In an example, the NIC framework (900) is updated (or finetuned) where the one or more sets of pretrained parameters are replaced by the one or more sets of replacement parameters, respectively.

In a first scenario, the one or more modification parameters includes a first subset of the one or more modification parameters and a second subset of the one or more modification parameters. The first subset of the one or more modification parameters corresponds to a first subset of the one or more sets of pretrained parameters, respectively. The second subset of the one or more modification parameters corresponds to a second subset of the one or more sets of pretrained parameters, respectively. In the first scenario, the first subset of the one or more sets of pretrained parameters is used in the pretrained video encoder, and the second subset of the one or more sets of pretrained parameters is used in the pretrained video decoder.

On an encoder side, the first subset of the one or more sets of pretrained parameters is modified by the first subset of the one or more modification parameters, respectively, for example, by a multiplication with a scaling factor, an addition with an offset, or a combination of a multiplication and an addition. The first subset of the one or more sets of pretrained parameters can be replaced by a first subset of the one or more sets of replacement parameters, respectively. Thus, the pretrained video encoder can be updated to the updated video encoder by the training process. The one or more images can be encoded using the updated video encoder.

Neural network update information indicating the second subset of the one or more modification parameters can be encoded and signaled in a bitstream. The one or more encoded images and the neural network update information can be transmitted in the bitstream.

On the decoder side, the pretrained video decoder receives and decodes the neural network update information to determine the second subset of the one or more modification parameters. The pretrained video decoder is updated to the updated video decoder when the second subset of the one or more sets of pretrained parameters in the pretrained video decoder is modified by the second subset of the one or more modification parameters, respectively. In an example, the second subset of the one or more sets of pretrained parameters in the pretrained video decoder is replaced by a second subset of the one or more sets of replacement parameters. The one or more encoded images can be decoded using the updated video decoder.

FIGS. 16A-16B show an example of the first scenario. For example, the one or more modification parameters includes a first modification parameter (e.g., a scaling factor of 1.1) and a second modification parameter (e.g., an offset of 0.1). The scaling factor modifies a first set of pretrained parameter including N1 pretrained parameters in the pretrained context model NN (916). The offset modifies a second set of pretrained parameters including N2 pretrained parameters in the pretrained main decoder network (915).

The first subset of the one or more modification parameters includes the scaling factor, the second subset of the one or more modification parameters includes the scaling factor and the offset. The scaling factor modifies a first subset of the one or more sets of pretrained parameters (e.g., the first set of pretrained parameter). The scaling factor and the offset modify a second subset of the one or more sets of pretrained parameters (e.g., the first set of pretrained parameter and the second set of pretrained parameters), respectively. Accordingly, on the encoder side, the N1 pretrained parameters in the pretrained context model NN (916) can be replaced by N1 corresponding replacement parameters such that the pretrained video encoder (1600A) can be updated. The pretrained context model NN (916) is also updated to be the updated context model NN (916). On the decoder side, the N1 pretrained parameters can be replaced by the N1 corresponding replacement parameters and the N2 pretrained parameters can be replaced by N2 corresponding replacement parameters, updating the pretrained context model NN (916) to be the updated context model NN (916) and updating the pretrained main decoder network (915) to be the updated main decoder network (915). Thus, the pretrained video decoder (1600B) can be updated.

In a second scenario, none of the one or more modification parameters is used to modify pretrained parameter(s) in the pretrained video encoder on the encoder side. Rather, the one or more modification parameters is used to modify the one or more sets of pretrained parameters in the pretrained video decoder on the decoder side. Thus, the pretrained video encoder is not updated and continues to be the pretrained video encoder after the training process. In an embodiment, the neural network update information indicates the one or more modification parameters. The one or more images can be encoded using the pretrained video encoder and transmitted in the bitstream with the neural network update information.

On the decoder side, the pretrained video decoder can receive and decode the neural network update information to determine the one or more modification parameters. The pretrained video decoder is updated to the updated video decoder when the one or more sets of pretrained parameters in the pretrained video decoder is modified by the one or more modification parameters or is replaced by the one or more sets of replacement parameters. The one or more encoded images can be decoded using the updated video decoder.

FIGS. 16A-16B show an example of the second scenario. For example, the one or more modification parameters include the second modification parameter that modifies the N2 pretrained parameters in the pretrained main decoder network (915). Thus, none of the one or more modification parameters is used in the pretrained video encoder (e.g., the pretrained video encoder (1600A)) on the encoder side. Thus, the pretrained video encoder (1600A) continues to be the pretrained video encoder after the training process. On the decoder side, the N2 pretrained parameters can be modified by the second modification parameter or replaced by N2 corresponding replacement parameters, which update the pretrained main decoder network (915). Thus, the pretrained video decoder (1600B) can be updated.

In a third scenario, the one or more modification parameters modify the one or more sets of pretrained parameters in the pretrained video encoder, and do not modify pretrained parameter(s) in the pretrained video decoder. Thus, the pretrained video encoder is updated to the updated video encoder by the training process. The one or more images can be encoded using the updated video encoder and transmitted in the bitstream. No neural network update information is encoded in the bitstream. On the decoder side, the pretrained video decoder is not updated and remains the pretrained video decoder. The one or more encoded images can be decoded using the pretrained video decoder.

FIGS. 16A-16B show an example of the third scenario. For example, the one or more modification parameters includes a modification parameter that modifies a set of pretrained parameters in the pretrained main encoder network (911). Accordingly, the set of pretrained parameters in the pretrained main encoder network (911) can be replaced by a set of replacement parameters such that the pretrained video encoder (1600A) can be updated to be the updated video encoder (1600A). The pretrained main encoder network (911) is also updated to be the updated main encoder network (911). On the decoder side, the pretrained video decoder (1600B) is not updated.

In various example, such as described in the first, second, and third scenarios, video decoding may be performed by pretrained decoders having different capabilities, including decoders with and without capabilities to update the pretrained parameters.

In an example, compression performance can be increased by coding the one or more images with the updated video encoder and/or the updated video decoder as compared to coding the one or more images with the pretrained video encoder and the pretrained video decoder. Therefore, the content-adaptive online training method can be used to adapt a pretrained NIC framework (e.g., the pretrained NIC framework (900)) to target image content (e.g., the one or more images to be transmitted), and thus finetuning the pretrained NIC framework. Accordingly, the video encoder on the encoder side and/or the video decoder on the decoder side can be updated.

The content-adaptive online training method can be used as a preprocessing step (e.g., pre-encoding step) for boosting the compression performance of a pretrained E2E NIC compression method.

In an embodiment, the one or more images include a single input image, and the finetuning process is performed with the single input image. The one or more modification parameters and thus the NIC framework (900) are trained and updated (e.g., finetuned) based on the single input image. The updated video encoder on the encoder side and/or the updated video decoder on the decoder side can be used to code the single input image and optionally other input images. The neural network update information can be encoded into the bitstream together with the encoded single input image.

In an embodiment, the one or more images include multiple input images, and the finetuning process is performed with the multiple input images. The one or more modification parameters and thus the NIC framework (900) are trained and updated (e.g., finetuned) based on the multiple input images. The updated video encoder on the encoder side and/or the updated decoder on the decoder side can be used to code the multiple input images and optionally other input images. The neural network update information can be encoded into the bitstream together with the encoded multiple input images.

The rate loss R can increase with the signaling of the neural network update information in the bitstream. When the one or more images include the single input image, the neural network update information is signaled for each encoded image, and a first increase to the rate loss R is used to indicate the increase to the rate loss R due to the signaling of the neural network update information per image. When the one or more images include the multiple input images, the neural network update information is signaled for and shared by the multiple input images, and a second increase to the rate loss R is used to indicate the increase to the rate loss R due to the signaling of the neural network update information per image. Because the neural network update information is shared by the multiple input images, the second increase to the rate loss R can be less than the first increase to the rate loss R. Thus, in some examples, it can be advantageous to finetune the one or more modification parameters and thus the NIC framework using the multiple input images.

In an embodiment, the one or more modification parameters to be trained modify the one or more sets of pretrained parameters in one component of the pretrained NIC framework (900). Thus, the one component of the pretrained NIC framework (900) is updated based on the one or more modification parameters, and other components of the pretrained NIC framework (900) are not updated.

The one component can be the pretrained context model NN (916), the pretrained entropy parameter NN (917), the pretrained main encoder network (911), the pretrained main decoder network (915), the pretrained hyper encoder (921), or the pretrained hyper decoder (925). The pretrained video encoder and/or the pretrained video decoder can be updated depending on which of the components in the pretrained NIC framework (900) is updated.

In an example, the one or more modification parameters to be trained modify the one or more sets of pretrained parameters in the pretrained context model NN (916), and thus the pretrained context model NN (916) is updated and the remaining components (911), (915), (921), (917), and (925) are not updated. In an example, the pretrained video encoder on the encoder side and the pretrained video decoder on the decoder side include the pretrained context model NN (916), and thus both the pretrained video encoder and the pretrained video decoder are updated.

In an example, the one or more modification parameters to be trained modify the one or more sets of pretrained parameters in the pretrained hyper decoder (925), and thus the pretrained hyper decoder (925) is updated and the remaining components (911), (915), (916), (917), and (921) are not updated. Thus, the pretrained video encoder is not updated and the pretrained video decoder is updated.

In an embodiment, the one or more modification parameters to be trained modify the one or more sets of pretrained parameters in multiple components of the pretrained NIC framework (900). Thus, the multiple components of the pretrained NIC framework (900) are updated based on the one or more modification parameters. In an example, the multiple components of the pretrained NIC framework (900) include all the components configured with neural networks (e.g., DNNs, CNNs). In an example, the multiple components of the pretrained NIC framework (900) include the CNN-based components: the pretrained main encoder network (911), the pretrained main decoder network (915), the pretrained context model NN (916), the pretrained entropy parameter NN (917), the pretrained hyper encoder (921), and the pretrained hyper decoder (925).

As described above, in an example, the one or more modification parameters to be updated modify the one or more sets of pretrained parameters in the pretrained video encoder of the pretrained NIC framework (900). In an example, the one or more modification parameters to be updated modify the one or more sets of pretrained parameters in the pretrained video decoder of the NIC framework (900). In an example, the one or more modification parameters to be updated modify the one or more sets of pretrained parameters in the pretrained video encoder and the pretrained video decoder of the pretrained NIC framework (900).

Each neural network-based component (e.g., the context model NN (916), the entropy parameter NN (917), the main encoder network (911), the main decoder network (915), the hyper encoder (921), or the hyper decoder (925)) in the NIC framework (900) can be configured with suitable parameters, such as respective weights, biases, or a combination of weights and biases. In some embodiments, modification parameters are applied to modify weights and biases in one or more of the neural network-based components. When CNN(s) are used, the weights can include elements in convolution kernels. One or more types of parameters can be used to specify the neural networks. In an embodiment, the one or more modification parameters modify bias term(s), and only the bias term(s) are modified by the one or more modification parameters. In an embodiment, the one or more modification parameters modify weights, and only the weights are modified by the one or more modification parameters. In an embodiment, the one or more modification parameters modify the weights and bias term(s).

In an embodiment, the one or more modification parameters include a scaling factor, and the set of pretrained parameters to be updated is modified by the scaling factor. The scaling factor can modify the set of pretrained parameters, such as a set of pretrained weights, a set of pretrained biases, a set of pretrained weights and pretrained biases, or the like. After the training process, the scaling factor is determined, and the set of pretrained parameters can be replaced with a set of replacement parameters, respectively where the set of replacement parameters is the set of pretrained parameters multiplied with the same scaling factor.

The scaling factor can be applied to modify a set of pretrained weights, a set of pretrained biases, or a set of pretrained weights and pretrained biases in one or more of the neural network-based components in a NIC framework (e.g., the NIC framework (900)).

In an embodiment, the scaling factor is applied to modify a set of pretrained weights, a set of pretrained biases, or a set of pretrained weights and pretrained biases in one of the neural network-based components in a NIC framework (e.g., the NIC framework (900)). For example, the set of pretrained weights includes a 5×5 convolutional kernel of a specific channel used in the context model NN (916). The scaling factor (e.g., 1.1) is obtained by the context-based online training process. The set of pretrained weights (e.g., the 5×5 convolutional kernel of the specific channel used in the context model NN (916)) is thus updated to be a set of replacement weights. The set of replacement weights can be the set of pretrained weights multiplied with the scaling factor (e.g., 1.1).

In an example, the scaling factor is applied to modify a set of pretrained weights, a set of pretrained biases, or a set of pretrained weights and pretrained biases in a CNN of a neural network-based component in a NIC framework (e.g., the NIC framework (900)). Referring to FIGS. 10-15, the CNN of the neural network-based component in the NIC framework (900) can be the CNN shown in FIG. 10 of the main encoder network (911), the CNN shown in FIG. 11 of the main decoder network (911), the CNN shown in FIG. 12 of the hyper encoder (921), the CNN shown in FIG. 13 of the hyper decoder (925), the CNN shown in FIG. 14 of the context model NN (916), or the CNN shown in FIG. 15 of the entropy parameter NN (917).

In an example, the scaling factor is applied to modify a set of pretrained weights, a set of pretrained biases, or a set of pretrained weights and pretrained biases in a convolutional layer or a deconvolutional layer in a CNN of a neural network-based component in a NIC framework (e.g., the NIC framework (900)), such as a third deconvolutional layer (DeConv: 3×3 c384 s1) in the CNN shown in FIG. 13 of the main decoder network (915).

In an example, the scaling factor is applied to modify a set of pretrained weights, a set of pretrained biases, or a set of pretrained weights and pretrained biases of a channel in a convolutional layer or a deconvolutional layer in a CNN of a neural network-based component in a NIC framework (e.g., the NIC framework (900)), such as a first channel (e.g., c1) of a third deconvolutional layer (DeConv: 3×3 c384 s1) in the CNN shown in FIG. 13 of the main decoder network (915).

In an example, the scaling factor is applied to modify a set of pretrained weights in a channel in a convolutional layer or a deconvolutional layer in a CNN of a neural network-based component in a NIC framework (e.g., the NIC framework (900)). The set of pretrained weights in the channel (e.g., c1) can include multiple elements, one or more rows, one or more columns, and/or the like. In an example, the set of pretrained weights in the channel (e.g., c1) includes all elements (e.g., 9 elements) in the channel.

The scaling factor can be applied to modify a set of pretrained weights, a set of pretrained biases, or a set of pretrained weights and pretrained biases in multiple ones of the neural network-based components in a NIC framework (e.g., the NIC framework (900)). For example, the scaling factor is obtained by the context-based online training process. The set of pretrained weights is thus updated to be a set of replacement weights based on the scaling factor. The set of replacement weights can be the set of pretrained weights (e.g., the 5×5 convolutional kernel of the specific channel used in the context model NN (916) and a 5×5 convolutional kernel of a specific channel in a first deconvolutional layer used in the main decoder network (915)) multiplied with the scaling factor (e.g., 1.1).

In an embodiment, the scaling factor can be applied to modify a set of pretrained weights, a set of pretrained biases, or a set of pretrained weights and pretrained biases in all of the neural network-based components in a NIC framework (e.g., the NIC framework (900)).

The description can be suitably adapted to another scaling factor used to modify another set of pretrained parameters, such as set plurality of pretrained weights, another set of pretrained biases, or another set of pretrained weights and pretrained biases in one or more of the neural network-based components in a NIC framework (e.g., the NIC framework (900)).

In some embodiments, one or more scaling factors are determined by the context-based online training process and can be applied to modify feature map(s). A scaling factor can modify an entire feature map or a subset of the feature map. A scaling factor can modify one or more elements in a feature map by multiplying with the one or more elements, respectively. Thus, the one or more elements in the feature map are replaced by the one or more elements multiplied by the scaling factor. A scaling factor can modify one or more rows of a feature map. A scaling factor can modify one or more columns of a feature map. A feature map can be modified by one or more scaling factors. A scaling factor can be used to modify one or more feature maps or portions of the feature maps.

In an embodiment, the one or more modification parameters includes an offset, and the set of pretrained parameters to be updated is modified by the offset. The offset can modify the set of pretrained parameters, such as a set of pretrained weights, a set of pretrained biases, a set of pretrained weights and pretrained biases, or the like. After the training process, the offset is determined, and the set of pretrained parameters can be replaced with a set of replacement parameters, respectively where the set of replacement parameters is an addition of the set of pretrained parameters and the same offset.

The offset can be applied to modify a set of pretrained weights, a set of pretrained biases, or a set of pretrained weights and pretrained biases in one or more of the neural network-based components in a NIC framework (e.g., the NIC framework (900)).

In an embodiment, the offset is applied to modify a set of pretrained weights, a set of pretrained biases, or a set of pretrained weights and pretrained biases in one of the neural network-based components in a NIC framework (e.g., the NIC framework (900)). For example, the set of pretrained weights includes the 5×5 convolutional kernel of the specific channel used in the context model NN (916). The offset (e.g., 0.1) is obtained by the context-based online training process. The set of pretrained weights (e.g., the 5×5 convolutional kernel of the specific channel used in the context model NN (916)) is thus updated to be a set of replacement weights. The set of replacement weights can be the addition of the set of pretrained weights and the offset (e.g., 0.1), respectively.

In an example, the offset is applied to modify a set of pretrained weights, a set of pretrained biases, or a set of pretrained weights and pretrained biases in a CNN of a neural network-based component in a NIC framework (e.g., the NIC framework (900)). Referring to FIGS. 10-15, the CNN of the neural network-based component in the NIC framework (900) can be the CNN shown in FIG. 10 of the main encoder network (911), the CNN shown in FIG. 11 of the main decoder network (911), the CNN shown in FIG. 12 of the hyper encoder (921), the CNN shown in FIG. 13 of the hyper decoder (925), the CNN shown in FIG. 14 of the context model NN (916), or the CNN shown in FIG. 15 of the entropy parameter NN (917).

In an example, the offset is applied to modify a set of pretrained weights, a set of pretrained biases, or a set of pretrained weights and pretrained biases in a convolutional layer or a deconvolutional layer in a CNN of a neural network-based component in a NIC framework (e.g., the NIC framework (900)), such as a third deconvolutional layer (DeConv: 3×3 c384 s1) in the CNN shown in FIG. 13 of the main decoder network (915).

In an example, the offset is applied to modify a set of pretrained biases in a convolutional layer or a deconvolutional layer in a CNN of a neural network-based component in a NIC framework (e.g., the NIC framework (900)).

In an example, the offset is applied to modify a set of pretrained weights, a set of pretrained biases, or a set of pretrained weights and pretrained biases of a channel in a convolutional layer or a deconvolutional layer in a CNN of a neural network-based component in a NIC framework (e.g., the NIC framework (900)), such as a first channel (e.g., c1) of a third deconvolutional layer (DeConv: 3×3 c384 s1) in the CNN shown in FIG. 13 of the main decoder network (915).

The offset can be applied to modify a set of pretrained weights, a set of pretrained biases, or a set of pretrained weights and pretrained biases in multiple ones of the neural network-based components in a NIC framework (e.g., the NIC framework (900)). For example, the offset is obtained by the context-based online training process. The set of pretrained weights is thus updated to be a set of replacement weights based on the offset. The set of replacement weights can be the addition of the set of pretrained weights (e.g., the 5×5 convolutional kernel of the specific channel used in the context model NN (916) and a 5×5 convolutional kernel of a specific channel in a first deconvolutional layer used in the main decoder network (915)) and the offset (e.g., 0.1).

In an embodiment, the offset can be applied to modify a set of pretrained weights, a set of pretrained biases, or a set of pretrained weights and pretrained biases in all of the neural network-based components in a NIC framework (e.g., the NIC framework (900)).

The description can be suitably adapted to another offset used to modify another set of pretrained parameters, such as another set of pretrained weights, another set of pretrained biases, or another set of pretrained weights and pretrained biases in one or more of the neural network-based components in a NIC framework (e.g., the NIC framework (900)).

In some embodiments, one or more offsets can be applied to modify feature map(s). An offset can modify an entire feature map or a subset of the feature map. An offset can modify one or more elements in a feature map by adding the offset to the one or more elements, respectively. Thus, the one or more elements in the feature map are replaced by one or more replacement elements that are the addition of the scaling factor and the one or more elements, respectively. An offset can modify one or more rows of a feature map. An offset can modify one or more columns of a feature map. A feature map can be modified by one or more offsets. An offset can be used to modify one or more feature maps or portions of the feature maps.

In an embodiment, the one or more modification parameters includes a scaling factor and a corresponding offset, and the set of pretrained parameters to be updated is modified by the scaling factor and the corresponding offset. The scaling factor and the corresponding offset can modify the set of pretrained parameters, such as a set of pretrained weights, a set of pretrained biases, a set of pretrained weights and pretrained biases, or the like. After the training process, the scaling factor and the corresponding offset are determined, and the set of pretrained parameters can be replaced with a set of replacement parameters, respectively.

The a set of replacement parameters can be determined based on the set of pretrained parameters, the scaling factor, and the corresponding offset. In an example, the set of replacement parameters is the addition of a set of intermediate parameters and the offset, and the set of intermediate parameters is the set of pretrained parameters multiplied by the scaling factor. In an example, the set of replacement parameters is the multiplication of a set of intermediate parameters and the scaling factor, and the set of intermediate parameters is the addition of the set of pretrained parameters and the offset.

The scaling factor and the corresponding offset can be applied to modify a set of pretrained weights, a set of pretrained biases, or a set of pretrained weights and pretrained biases in one or more of the neural network-based components in a NIC framework (e.g., the NIC framework (900)).

In an embodiment, the scaling factor and the corresponding offset are applied to modify a set of pretrained weights, a set of pretrained biases, or a set of pretrained weights and pretrained biases in one of the neural network-based components in a NIC framework (e.g., the NIC framework (900)). For example, the set of pretrained weights includes a 5×5 convolutional kernel of a specific channel used in the context model NN (916). The scaling factor (e.g., 1.1) and the corresponding offset (e.g., 0.1) are obtained by the context-based online training process. The set of pretrained weights (e.g., the 5×5 convolutional kernel of the specific channel used in the context model NN (916)) is thus updated to be a set of replacement weights, as described above.

In an example, the set of replacement parameters is the addition of a set of intermediate parameters and the offset (e.g., 0.1), and the set of intermediate parameters is the set of pretrained parameters multiplied by the scaling factor (e.g., 1.1).

In an example, the set of replacement parameters is the multiplication of a set of intermediate parameters and the scaling factor (e.g., 1.1), and the set of intermediate parameters is the addition of the set of pretrained parameters and the offset (e.g., 0.1).

In an example, the scaling factor and the corresponding offset are applied to modify a set of pretrained weights, a set of pretrained biases, or a set of pretrained weights and pretrained biases in a CNN of a neural network-based component in a NIC framework (e.g., the NIC framework (900)).

In an example, the scaling factor and the corresponding offset are applied to modify a set of pretrained weights, a set of pretrained biases, or a set of pretrained weights and pretrained biases in a convolutional layer or a deconvolutional layer in a CNN of a neural network-based component in a NIC framework (e.g., the NIC framework (900)), such as a third deconvolutional layer (DeConv: 3×3 c384 s1) in the CNN shown in FIG. 13 of the main decoder network (915).

In an example, the scaling factor and the corresponding offset are applied to modify a set of pretrained weights, a set of pretrained biases, or a set of pretrained weights and pretrained biases of a channel in a convolutional layer or a deconvolutional layer in a CNN of a neural network-based component in a NIC framework (e.g., the NIC framework (900)), such as a first channel (e.g., c1) of a third deconvolutional layer (DeConv: 3×3 c384 s1) in the CNN shown in FIG. 13 of the main decoder network (915).

The scaling factor and the corresponding offset can be applied to modify a set of pretrained weights, a set of pretrained biases, or a set of pretrained weights and pretrained biases in multiple ones of the neural network-based components in a NIC framework (e.g., the NIC framework (900)). For example, the scaling factor and the corresponding offset are obtained by the context-based online training process. The set of pretrained weights is thus updated to be a set of replacement weights based on the scaling factor and the corresponding offset. The set of replacement weights can be the set of pretrained weights (e.g., the 5×5 convolutional kernel of the specific channel used in the context model NN (916) and a 5×5 convolutional kernel of a specific channel in a first deconvolutional layer used in the main decoder network (915)) modified by the scaling factor (e.g., 1.1) and the offset (e.g., 0.1, as described above.

In an embodiment, the scaling factor and the corresponding offset can be applied to modify a set of pretrained weights, a set of pretrained biases, or a set of pretrained weights and pretrained biases in all of the neural network-based components in a NIC framework (e.g., the NIC framework (900)).

The description can be suitably adapted to another scaling factor and a corresponding offset used to modify another set of pretrained parameters in one or more of the neural network-based components in a NIC framework (e.g., the NIC framework (900)).

In some embodiments, one or more scaling factors and corresponding one or more offsets can be applied to modify feature map(s). A scaling factor and a corresponding offset can modify an entire feature map or a subset of the feature map. A scaling factor and a corresponding offset can modify one or more elements in a feature map. A scaling factor and a corresponding offset can modify one or more rows of a feature map. A scaling factor and a corresponding offset can modify one or more columns of a feature map. A feature map can be modified by one or more scaling factors and the corresponding offset(s). A scaling factor and a corresponding offset can be used to modify one or more feature maps or portions of the feature maps.

The one or more modification parameters to be determined based on the training process can include scaling factor(s) and offset(s). In an example, each of the scaling factor(s) and offset(s) modifies a different set of pretrained parameters, as described above. In an example, one of the scaling factor(s) and one of the offset(s) modify a same set of pretrained parameters, as described above. In an example, each of the scaling factor(s) and offset(s) modifies a different feature map or a different portion of a feature map, as described above. In an example, one of the scaling factor(s) and one of the offset(s) modify a same feature map or a same portion of a feature map, as described above.

The finetuning process can include multiple epochs (e.g., iterations) where the one or more modification parameters (e.g., a scaling factor, an offset) are updated or determined in an iterative finetuning process. The finetuning process can stop when a training loss has flattened or is about to flatten. In an example, the finetuning process stops when the training loss (e.g., a R-D loss L) is below a first threshold. In an example, the finetuning process stops when a difference between two successive training losses is below a second threshold.

Two hyperparameters (e.g., a step size and a maximum number of steps) can be used in the finetuning process together with a loss function (e.g., an R-D loss L). As described above, in an example, the rate loss R in the loss function L during the finetuning process is estimated, for example, based on the noise injection and the BPP estimator. The maximum number of iterations can be used as a threshold of a maximum number of iterations to terminate the finetuning process. In an example, the finetuning process stops when a number of iterations reaches the maximum number of iterations.

The step size can indicate a learning rate of the online training process (e.g., the online finetuning process). The step size can be used in a gradient descent algorithm or a backpropagation calculation performed in the finetuning process. For example, each adjustment to a modification parameter being trained is based on the step size and a corresponding gradient (e.g., a gradient of the R-D loss with respect to the modification parameter being trained) used in the gradient descent algorithm. A step size can be determined using any suitable method. In an embodiment, different step sizes are used for images with different types of contents to achieve optimal results. Different types can refer to different variances. In an example, the step size is determined based on a variance of an image used to update a NIC framework. For example, a step size of an image having a high variance is larger than a step size of an image having a low variance where the high variance is larger than the low variance.

In an embodiment, a first step size can be used to run a certain number (e.g., 100) iterations. Then, a second step size (e.g., the first step size plus or minus a size increment) can be used to run the certain number of iterations. Results from the first step size and the second step size can be compared to determine a step size to be used. More than two step sizes may be tested to determine an optimal step size.

A step size can vary during the finetuning process. The step size can have an initial value at an onset of the finetuning process, and the initial value can be reduced (e.g., halved) at a later stage of the finetuning process, for example, after a certain number of iterations to achieve a finer tuning. The step size or the learning rate can be varied by a scheduler during the iterative online training. The scheduler can include a parameter adjustment method used to adjust the step size. The scheduler can determine a value for the step size such that the step size can increase, decrease, or remain constant in a number of intervals. In an example, the learning rate is altered in each step by the scheduler. A single scheduler or multiple different schedulers can be used for different images. Thus, multiple sets of replacement parameter(s) can be generated based on the multiple schedulers, and one of the multiple sets of replacement parameter(s) with the better compression performance (e.g., a smaller R-D loss) can be chosen.

At the end of the finetuning process, one or more updated parameters can be computed for the respective one or more modification parameters (e.g., a scaling factor, or an offset). In an embodiment, the one or more updated parameters are calculated as differences between the one or more modification parameters and a corresponding one or more "pretrained" modification parameters (e.g., 1 for a scaling factor and 0 for an offset). In an embodiment, the one or more updated parameters are the one or more modification parameters, respectively.

The one or more updated parameters can be generated from the one or more modification parameters, respectively, for example, using a certain linear or nonlinear transform, and the one or more updated parameters are representative parameter(s) generated based on the one or more modification parameters. The one or more modification parameters are transformed into the one or more updated parameters for better compression.

In an example, the one or more updated parameters can be compressed, for example, using LZMA2 that is a variation of a Lempel-Ziv-Markov chain algorithm (LZMA), a bzip2 algorithm, or the like. In an example, compression is omitted for the one or more updated parameters.

In some embodiments, the one or more updated parameters or the second subset of the one or more updated parameters can be encoded into the bitstream as the neural network update information where the neural network update information indicates the one or more replacement parameters or the second subset of the one or more replacement parameters.

An updated parameter corresponding to a modification parameter can be encoded into the bitstream as the neural network update information where the neural network update information indicates the modification parameter. In an example, the set of pretrained parameters modified by the modification parameter includes one or more of the pretrained decoder parameters configured for the pretrained video decoder. Thus, the neural network update information indicates the modification parameter is encoded into a bitstream and signaled. In an example, the set of pretrained parameters modified by the modification parameter includes none of the pretrained decoder parameters configured for the pretrained video decoder. Thus, no neural network update information indicating the modification parameter is encoded and signaled.

After the finetuning process, in some examples, the pretrained video encoder on the encoder side can be updated or finetuned based on the modification parameter. For example, the set of pretrained parameters modified by the modification parameter includes one or more of the pretrained encoder parameter(s) configured for the pretrained video encoder, and thus the one or more of the pretrained encoder parameter(s) can be updated based on the modification parameter, and the pretrained video encoder is updated. An input image (e.g., one of the one or more images used in the finetuning process) can be encoded into the bitstream using the updated video encoder. Thus, the bitstream includes both the encoded image and the neural network update information.

If applicable, in an example, the neural network update information is decoded (e.g., decompressed) by the pretrained video decoder to obtain the updated parameter. In an example, the modification parameter can be obtained based on the relationship between the updated parameter and the modification parameter described above. The pretrained video decoder can be modified and the updated video decoder can be used to decode the encoded image, as described above.

The NIC framework can include any type of neural networks and use any neural network-based image compression methods, such as a context-hyperprior encoder-decoder framework (e.g., the NIC framework shown in FIG. 9)), a scale-hyperprior encoder-decoder framework, a Gaussian Mixture Likelihoods framework and variants of the Gaussian Mixture Likelihoods framework, an RNN-based recursive compression method and variants of the RNN-based recursive compression method, and the like.

Compared with related E2E image compression methods, the content-adaptive online training methods and apparatus in the disclosure can have the following benefits. Adaptive online training mechanisms can be exploited to improve the NIC coding efficiency. Use of a flexible and general framework can accommodate various types of pretrained frameworks and quality metrics. For example, certain pretrained parameters in the various types of pretrained frameworks can be replaced by using modification parameter(s) determined based on online training with images to be encoded and transmitted.

B. Type II Content-Adaptive Online Training

One or more pretrained parameters in the NIC pretrained parameters in the pretrained NIC framework (900) can further be trained (e.g., finetuned) based on the one or more images to be encoded and/or transmitted where the one or more images can be different from the set of training images. The one or more pretrained parameters used in the NIC pretrained parameters can be finetuned by optimizing the joint R-D loss L based on the one or more images. The one or more pretrained parameters that have been finetuned by the one or more images are referred to as the one or more replacement parameters or the one or more finetuned parameters. In an embodiment, after the one or more pretrained parameters in the NIC pretrained parameters have been finetuned (e.g., replaced) by the one or more replacement parameters, neural network update information is encoded into a bitstream to indicate the one or more replacement parameters or a subset of the one or more replacement parameters. In an example, the NIC framework (900) is updated (or finetuned) where the one or more pretrained parameters are replaced by the one or more replacement parameters, respectively.

In a first scenario, the one or more pretrained parameters includes a first subset of the one or more pretrained parameters and a second subset of the one or more pretrained parameters. The one or more replacement parameters includes a first subset of the one or more replacement parameters and a second subset of the one or more replacement parameters.

The first subset of the one or more pretrained parameters is used in the pretrained video encoder and is replaced by the first subset of the one or more replacement parameters, for example, in the training process. Thus, the pretrained video encoder is updated to the updated video encoder by the training process. The neural network update information can indicate the second subset of the one or more replacement parameters that is to replace the second subset of the one or more replacement parameters. The one or more images can be encoded using the updated video encoder and transmitted in the bitstream with the neural network update information.

On the decoder side, the second subset of the one or more pretrained parameters is used in the pretrained video decoder. In an embodiment, the pretrained video decoder receives and decodes the neural network update information to determine the second subset of the one or more replacement parameters. The pretrained video decoder is updated to the updated video decoder when the second subset of the one or more pretrained parameters in the pretrained video decoder is replaced by the second subset of the one or more replacement parameters. The one or more encoded images can be decoded using the updated video decoder.

FIGS. 16A-16B show an example of the first scenario. For example, the one or more pretrained parameters include N1 pretrained parameters in the pretrained context model NN (916) and N2 pretrained parameters in the pretrained main decoder network (915). Thus, the first subset of the one or more pretrained parameters include the N1 pretrained parameters, and the second subset of the one or more pretrained parameters are identical to the one or more pretrained parameters. Accordingly, the N1 pretrained parameters in the pretrained context model NN (916) can be replaced by N1 corresponding replacement parameters such that the pretrained video encoder (1600A) can be updated to the updated video encoder (1600A). The pretrained context model NN (916) is also updated to be the updated context model NN (916). On the decoder side, the N1 pretrained parameters can be replaced by the N1 corresponding replacement parameters and the N2 pretrained parameters can be replaced by N2 corresponding replacement parameters, updating the pretrained context model NN (916) to be the updated context model NN (916) and updating the pretrained main decoder network (915) to be the updated main decoder network (915). Thus, the pretrained video decoder (1600B) can be updated to the updated video decoder (1600B).

In a second scenario, none of the one or more pretrained parameters is used in the pretrained video encoder on the encoder side. Rather, the one or more pretrained parameters is used in the pretrained video decoder on the decoder side. Thus, the pretrained video encoder is not updated and continues to be the pretrained video encoder after the training process. In an embodiment, the neural network update information indicates the one or more replacement parameters. The one or more images can be encoded using the pretrained video encoder and transmitted in the bitstream with the neural network update information.

On the decoder side, the pretrained video decoder can receive and decode the neural network update information to determine the one or more replacement parameters. The pretrained video decoder is updated to the updated video decoder when the one or more pretrained parameters in the pretrained video decoder is replaced by the one or more replacement parameters. The one or more encoded images can be decoded using the updated video decoder.

FIGS. 16A-16B show an example of the second scenario. For example, the one or more pretrained parameters include N2 pretrained parameters in the pretrained main decoder network (915). Thus, none of the one or more pretrained parameters is used in the pretrained video encoder (e.g., the pretrained video encoder (1600A)) on the encoder side. Thus, the pretrained video encoder (1600A) continues to be the pretrained video encoder after the training process. On the decoder side, the N2 pretrained parameters can be replaced by N2 corresponding replacement parameters, which update the pretrained main decoder network (915) to the updated main decoder network (915). Thus, the pretrained video decoder (1600B) can be updated to the updated video decoder (1600B).

In a third scenario, the one or more pretrained parameters are used in the pretrained video encoder and are replaced by the one or more replacement parameters, for example, in the training process. Thus, the pretrained video encoder is updated to the updated video encoder by the training process. The one or more images can be encoded using the updated video encoder and transmitted in the bitstream. No neural network update information is encoded in the bitstream. On the decoder side, the pretrained video decoder is not updated and remains the pretrained video decoder. The one or more encoded images can be decoded using the pretrained video decoder.

FIGS. 16A-16B show an example of the third scenario. For example, the one or more pretrained parameters are in the pretrained main encoder network (911). Accordingly, the one or more pretrained parameters in the pretrained main encoder network (911) can be replaced by the one or more replacement parameters such that the pretrained video encoder (1600A) can be updated to be the updated video encoder (1600A). The pretrained main encoder network (911) is also updated to be the updated main encoder network (911). On the decoder side, the pretrained video decoder (1600B) is not updated.

In various example, such as described in the first, second, and third scenarios, video decoding may be performed by pretrained decoders having different capabilities, including decoders with and without capabilities to update the pretrained parameters.

In an example, compression performance can be increased by coding the one or more images with the updated video encoder and/or the updated video decoder as compared to coding the one or more images with the pretrained video encoder and the pretrained video decoder. Therefore, the content-adaptive online training method can be used to adapt a pretrained NIC framework (e.g., the pretrained NIC framework (900)) to target image content (e.g., the one or more images to be transmitted), and thus finetuning the pretrained NIC framework. Accordingly, the video encoder on the encoder side and/or the video decoder on the decoder side can be updated.

The content-adaptive online training method can be used as a preprocessing step (e.g., pre-encoding step) for boosting the compression performance of a pretrained E2E NIC compression method.

In an embodiment, the one or more images include a single input image, and the finetuning process is performed with the single input image. The NIC framework (900) is trained and updated (e.g., finetuned) based on the single input image. The updated video encoder on the encoder side and/or the updated video decoder on the decoder side can be used to code the single input image and optionally other input images. The neural network update information can be encoded into the bitstream together with the encoded single input image.

In an embodiment, the one or more images include multiple input images, and the finetuning process is performed with the multiple input images. The NIC framework (900) is trained and updated (e.g., finetuned) based on the multiple input images. The updated video encoder on the encoder side and/or the updated decoder on the decoder side can be used to code the multiple input images and optionally other input images. The neural network update information can be encoded into the bitstream together with the encoded multiple input images.

The rate loss R can increase with the signaling of the neural network update information in the bitstream. When the one or more images include the single input image, the neural network update information is signaled for each encoded image, and a first increase to the rate loss R is used to indicate the increase to the rate loss R due to the signaling of the neural network update information per image. When the one or more images include the multiple input images, the neural network update information is signaled for and shared by the multiple input images, and a second increase to the rate loss R is used to indicate the increase to the rate loss R due to the signaling of the neural network update information per image. Because the neural network update information is shared by the multiple input images, the second increase to the rate loss R can be less than the first increase to the rate loss R. Thus, in some examples, it can be advantageous to finetune the NIC framework using the multiple input images.

In an embodiment, the one or more pretrained parameters to be updated are in one component of the pretrained NIC framework (900). Thus, the one component of the pretrained NIC framework (900) is updated based on the one or more replacement parameters, and other components of the pretrained NIC framework (900) are not updated.

The one component can be the pretrained context model NN (916), the pretrained entropy parameter NN (917), the pretrained main encoder network (911), the pretrained main decoder network (915), the pretrained hyper encoder (921), or the pretrained hyper decoder (925). The pretrained video encoder and/or the pretrained video decoder can be updated depending on which of the components in the pretrained NIC framework (900) is updated.

In an example, the one or more pretrained parameters to be updated are in the pretrained context model NN (916), and thus the pretrained context model NN (916) is updated and the remaining components (911), (915), (921), (917), and (925) are not updated. In an example, the pretrained video encoder on the encoder side and the pretrained video decoder on the decoder side include the pretrained context model NN (916), and thus both the pretrained video encoder and the pretrained video decoder are updated.

In an example, the one or more pretrained parameters to be updated are in the pretrained hyper decoder (925), and thus the pretrained hyper decoder (925) is updated and the remaining components (911), (915), (916), (917), and (921) are not updated. Thus, the pretrained video encoder is not updated and the pretrained video decoder is updated.

In an embodiment, the one or more pretrained parameters to be updated are in multiple components of the pretrained NIC framework (900). Thus, the multiple components of the pretrained NIC framework (900) are updated based on the one or more replacement parameters. In an example, the multiple components of the pretrained NIC framework (900) include all the components configured with neural networks (e.g., DNNs, CNNs). In an example, the multiple components of the pretrained NIC framework (900) include the CNN-based components: the pretrained main encoder network (911), the pretrained main decoder network (915), the pretrained context model NN (916), the pretrained entropy parameter NN (917), the pretrained hyper encoder (921), and the pretrained hyper decoder (925).

As described above, in an example, the one or more pretrained parameters to be updated are in the pretrained video encoder of the pretrained NIC framework (900). In an example, the one or more pretrained parameters to be updated are in the pretrained video decoder of the NIC framework (900). In an example, the one or more pretrained parameters to be updated are in the pretrained video encoder and the pretrained video decoder of the pretrained NIC framework (900).

The NIC framework (900) can be based on neural networks, for example, one or more components in the NIC framework (900) can include neural networks, such as CNNs, DNNs, and/or the like. As described above, the neural networks can be specified by different types of parameters, such as weights, biases, and the like.

Each neural network-based component (e.g., the context model NN (916), the entropy parameter NN (917), the main encoder network (911), the main decoder network (915), the hyper encoder (921), or the hyper decoder (925)) in the NIC framework (900) can be configured with suitable parameters, such as respective weights, biases, or a combination of weights and biases. When CNN(s) are used, the weights can include elements in convolution kernels. One or more types of parameters can be used to specify the neural networks. In an embodiment, the one or more pretrained parameters to be updated are bias term(s), and only the bias term(s) are replaced by the one or more replacement parameters. In an embodiment, the one or more pretrained parameters to be updated are weights, and only the weights are replaced by the one or more replacement parameters. In an embodiment, the one or more pretrained parameters to be updated include the weights and bias term(s), and all the pretrained parameters including the weights and bias term(s) are replaced by the one or more replacement parameters. In an embodiment, other parameters can be used to specify the neural networks, and the other parameters can be finetuned.

The finetuning process can include multiple epochs (e.g., iterations) where the one or more pretrained parameters (e.g., a weight, a bias) are updated or learned in an iterative finetuning process. The finetuning process can stop when a training loss has flattened or is about to flatten. In an example, the finetuning process stops when the training loss (e.g., a R-D loss L) is below a first threshold. In an example, the finetuning process stops when a difference between two successive training losses is below a second threshold.

Two hyperparameters (e.g., a step size and a maximum number of steps) can be used in the finetuning process together with a loss function (e.g., an R-D loss L), as described above in Type I content-adaptive online training.

At the end of the finetuning process, one or more updated parameters can be computed for the respective one or more replacement parameters. In an embodiment, the one or more updated parameters are calculated as differences between the one or more replacement parameters and the corresponding one or more pretrained parameters. In an embodiment, the one or more updated parameters are the one or more replacement parameters, respectively.

In an embodiment, the one or more updated parameters can be generated from the one or more replacement parameters, for example, using a certain linear or nonlinear transform, and the one or more updated parameters are representative parameter(s) generated based on the one or more replacement parameters. The one or more replacement parameters are transformed into the one or more updated parameters for better compression.

A first subset of the one or more updated parameters corresponds to the first subset of the one or more replacement parameters, and a second subset of the one or more updated parameters corresponds to the second subset of the one or more replacement parameters.

In an example, the one or more updated parameters can be compressed, for example, using LZMA2 that is a variation of a Lempel-Ziv-Markov chain algorithm (LZMA), a bzip2 algorithm, or the like. In an example, compression is omitted for the one or more updated parameters. In some embodiments, the one or more updated parameters or the second subset of the one or more updated parameters can be encoded into the bitstream as the neural network update information where the neural network update information indicates the one or more replacement parameters or the second subset of the one or more replacement parameters.

After the finetuning process, in some examples, the pretrained video encoder on the encoder side can be updated or finetuned based on (i) the first subset of the one or more replacement parameters or (ii) the one or more replacement parameters. An input image (e.g., one of the one or more images used to in the finetuning process) can be encoded into the bitstream using the updated video encoder. Thus, the bitstream includes both the encoded image and the neural network update information.

If applicable, in an example, the neural network update information is decoded (e.g., decompressed) by the pretrained video decoder to obtain the one or more updated parameters or the second subset of the one or more updated parameters. In an example, the one or more replacement parameters or the second subset of the one or more replacement parameters can be obtained based on the relationship between the one or more updated parameters and the one or more replacement parameters described above. The pretrained video decoder can be finetuned and the updated video decoded can be used to decode the encoded image, as described above.

The NIC framework can include any type of neural networks and use any neural network-based image compression methods, such as a context-hyperprior encoder-decoder framework (e.g., the NIC framework shown in FIG. 9)), a scale-hyperprior encoder-decoder framework, a Gaussian Mixture Likelihoods framework and variants of the Gaussian Mixture Likelihoods framework, an RNN-based recursive compression method and variants of the RNN-based recursive compression method, and the like.

Compared with related E2E image compression methods, the content-adaptive online training methods and apparatus in the disclosure can have the following benefits. Adaptive online training mechanisms are exploited to improve the NIC coding efficiency. Use of a flexible and general framework can accommodate various types of pretrained frameworks and quality metrics. For example, certain pretrained parameters in the various types of pretrained frameworks can be replaced by using online training with images to be encoded and transmitted.

In some embodiments, the content-adaptive online training including the Type I content-adaptive online training and the Type II content-adaptive online training can be based on one or more input blocks in an image (e.g., a raw image or an image having residue data) to be encoded and/or transmitted. The Type I content-adaptive online training based on the one or more input blocks can be referred to as block-wise Type I content-adaptive online training.

In an embodiment, the Type I content-adaptive online training and the Type II content-adaptive online training are combined such that pretrained parameter(s) (e.g., weight(s) and/or bias(es)) used in the pretrained NIC framework and modification parameter(s) (e.g., scaling factor(s) and/or offset(s)) that modify one or more sets of pretrained parameters are updated using content-adaptive online training.

Figure 19:
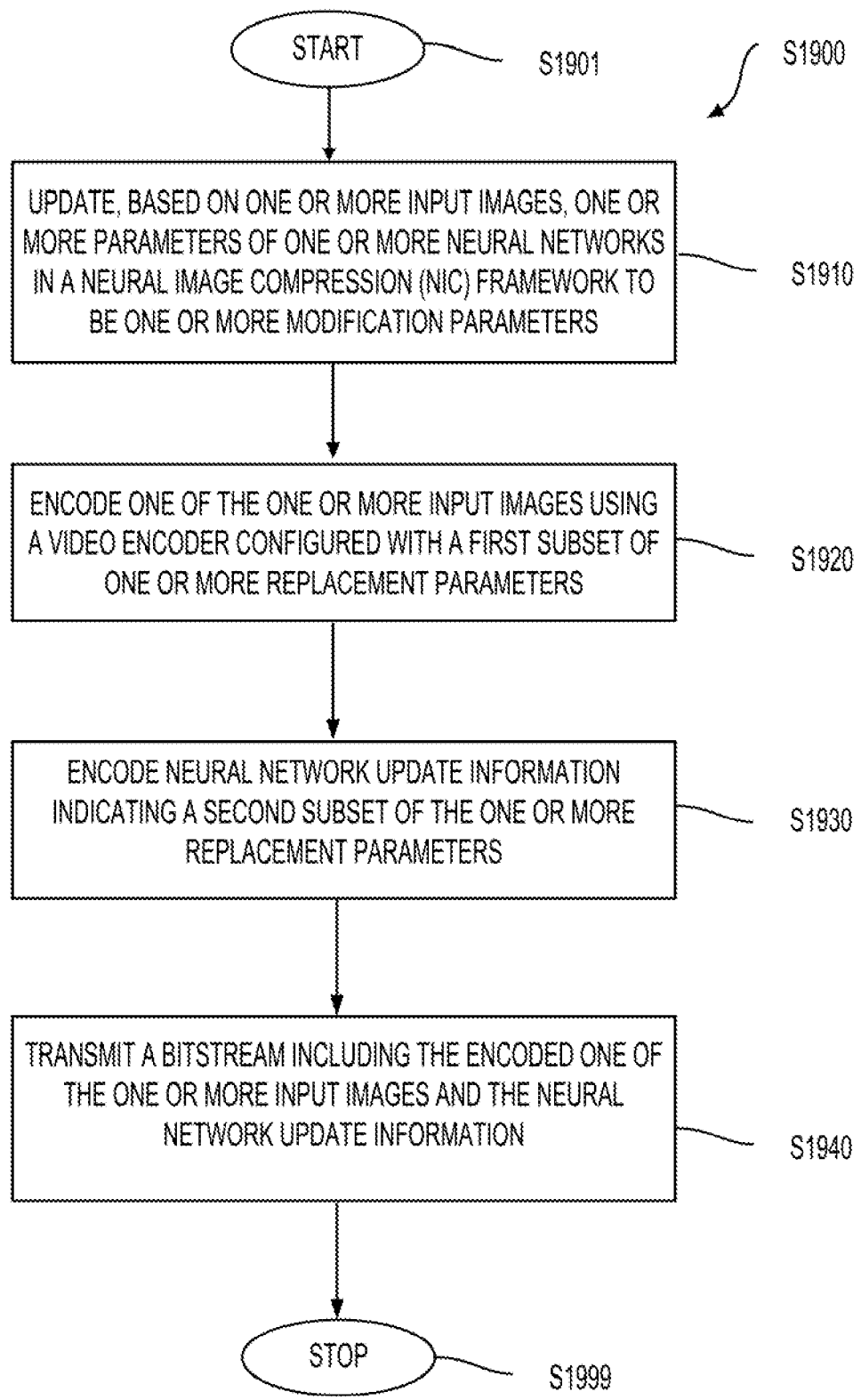
FIG. 19 shows a flow chart outlining a process according to an embodiment of the disclosure.

IV. Flow Charts Outlining Exemplary Encoding and Decoding Processes Based on Content-Adaptive Online Training FIG. 19 shows a flow chart outlining a process (1900) according to an embodiment of the disclosure. The process (1900) can be used to encode an image, such as a raw image or a residue image. In various embodiments, the process (1900) is executed by processing circuitry, such as the processing circuitry in the terminal devices (310), (320), (330) and (340), the processing circuitry that performs functions of the video encoder (1600A), the processing circuitry that performs functions of the video encoder (1700), or the processing circuitry that performs functions of the NIC framework (900). In an example, the processing circuitry performs a combination of functions of (i) one of the video encoders (403), (603), and (703) and (ii) one of the video encoders (1600A) and the video encoder (1700). In some embodiments, the process (1900) is implemented in software instructions, thus when the processing circuitry executes the software instructions, the processing circuitry performs the process (1900). The process starts at (S1901). In an example, an NIC framework is based on neural networks. In an example, the NIC framework is the NIC framework (900) described with reference to FIG. 9. The NIC framework can be based on CNNs, such as described with reference to FIGS. 10-15. A video encoder (e.g., (1600A) or (1700)) and a corresponding video decoder (e.g., (1600B) or (1800)) can include multiple components in the NIC framework, as described above. The NIC framework based on neural networks are pretrained, and thus the video encoder and the video decoder are pretrained. The process (1900) proceeds to (S1910).

At (S1910), a finetuning process is performed on the NIC framework based on one or more images (or input image(s)). The input image(s) can be any suitable image(s) having any suitable size(s). In some examples, the input image(s) include raw image(s), natural image(s), computer-generated image(s), and/or the like that are in the spatial domain.

In some examples, the input image(s) include residue data in the spatial domain, for example, calculated by a residue calculator (e.g., the residue calculator (723)). Components in various apparatuses can be suitably combined to achieve (S1910), for example, referring to FIGS. 7 and 9, the residue data from the residue calculator are combined into an image and are fed into the main encoder network (911) in the NIC framework.

One or more modification parameters can be determined, for example, adjusted from a default value (e.g., 1 for a scaling factor and 0 for an offset) based on the one or more images. In an embodiment, the one or more modification parameters are being updated during the training process described in (S1910), for example, in each step. The one or more modification parameters can be scaling factor(s) or offset(s). The one or more modification parameters can modify one or more sets of pretrained parameters, respectively, in at least one neural network in the NIC framework to generate one or more sets of replacement parameters. Each of the one or more modification parameters can modify a corresponding set of pretrained parameters.

In an embodiment, a first subset of the one or more sets of pretrained parameters that is modified by a first subset of the one or more modification parameters is used in at least one neural network in the video encoder (e.g., the pretrained video encoder), and thus the at least one neural network in the video encoder can be updated based on the first subset of the one or more modification parameters. In an example, the at least one neural network in the video encoder is updated when the first subset of the one or more sets of pretrained parameters is replaced with a first subset of the one or more sets of replacement parameters, respectively. In an example, the at least one neural network in the video encoder is updated iteratively in the finetuning process.

In an example, none of the one or more sets of pretrained parameters are included in the video encoder, and thus the video encoder is not updated and remains the pretrained video encoder.

At (S1920), one of the one or more images can be encoded using the video encoder having the at least one updated neural network. In an example, the one of the one or more images is encoded after the at least one neural network in the video encoder is updated.

The step (S1920) can be suitably adapted. For example, the video encoder is not updated when none of the one or more sets of pretrained parameters are included in the at least one neural network in the video encoder, and thus the one of the one or more images can be encoded using the pretrained video encoder (e.g., the video encoder including the at least one pretrained neural network).

At (S1930), neural network update information indicating a second subset of the one or more modification parameters can be encoded into the bitstream. In an example, the second subset of the one or more modification parameters is to be used to update at least one neural network in the video decoder on the decoder side. The step (S1930) can be omitted, and none of the neural networks in the video decoder is updated, for example, if the second subset of the one or more modification parameters includes no modification parameters and no neural network update information is signaled in the bitstream.

At (S1940), the bitstream including the encoded one of the one or more images and the neural network update information can be transmitted. The step (S1940) can be suitably adapted. For example, if the step (S1930) is omitted, the bitstream does not include the neural network update information. The process (1900) proceeds to (S1999), and terminates.

The process (1900) can be suitably adapted to various scenarios and steps in the process (1900) can be adjusted accordingly. One or more of the steps in the process (1900) can be adapted, omitted, repeated, and/or combined. Any suitable order can be used to implement the process (1900). Additional step(s) can be added. For example, in addition to encoding the one of the one or more images, other image(s) such as remaining one(s) of the one or more images are encoded in (S1920), and are transmitted in (S1940).

In some examples of the process (1900), the one of the one or more images is encoded by the updated video encoder and transmitted in the bitstream. As the finetuning process is based on the one or more images, the finetuning process is based on the context to be encoded, and thus is context-based.

In some examples, the neural network update information further indicates what pretrained parameter(s) in the video decoder the second subset of the one or more modification parameters modifies so that corresponding pretrained parameter(s) in the video decoder can be updated. The neural network update information can indicate component information (e.g., (915)), layer information (e.g., the fourth layer DeConv: 5×5 c3 s2), channel information (e.g., the second channel), and/or the like of the pretrained parameter(s) in the video decoder that the second subset of the one or more modification parameters modifies. Therefore, referring to FIG. 11, the pretrained parameter(s) in the video decoder that the second subset of the one or more modification parameters modifies include the convolution kernel of the second channel of DeConv: 5×5 c3 s2 in the main decoder network (915). Thus, the convolution kernel of the second channel of DeConv: 5×5 c3 s2 in the pretrained main decoder network (915) is updated. In some examples, the component information (e.g., (915)), the layer information (e.g., the fourth layer DeConv: 5×5 c3 s2), the channel information (e.g., the second channel), and/or the like of the pretrained parameter(s) in the video decoder that the second subset of the one or more modification parameters modifies are pre-determined and stored in the pretrained video decoder, and thus are not signaled.

Figure 20:
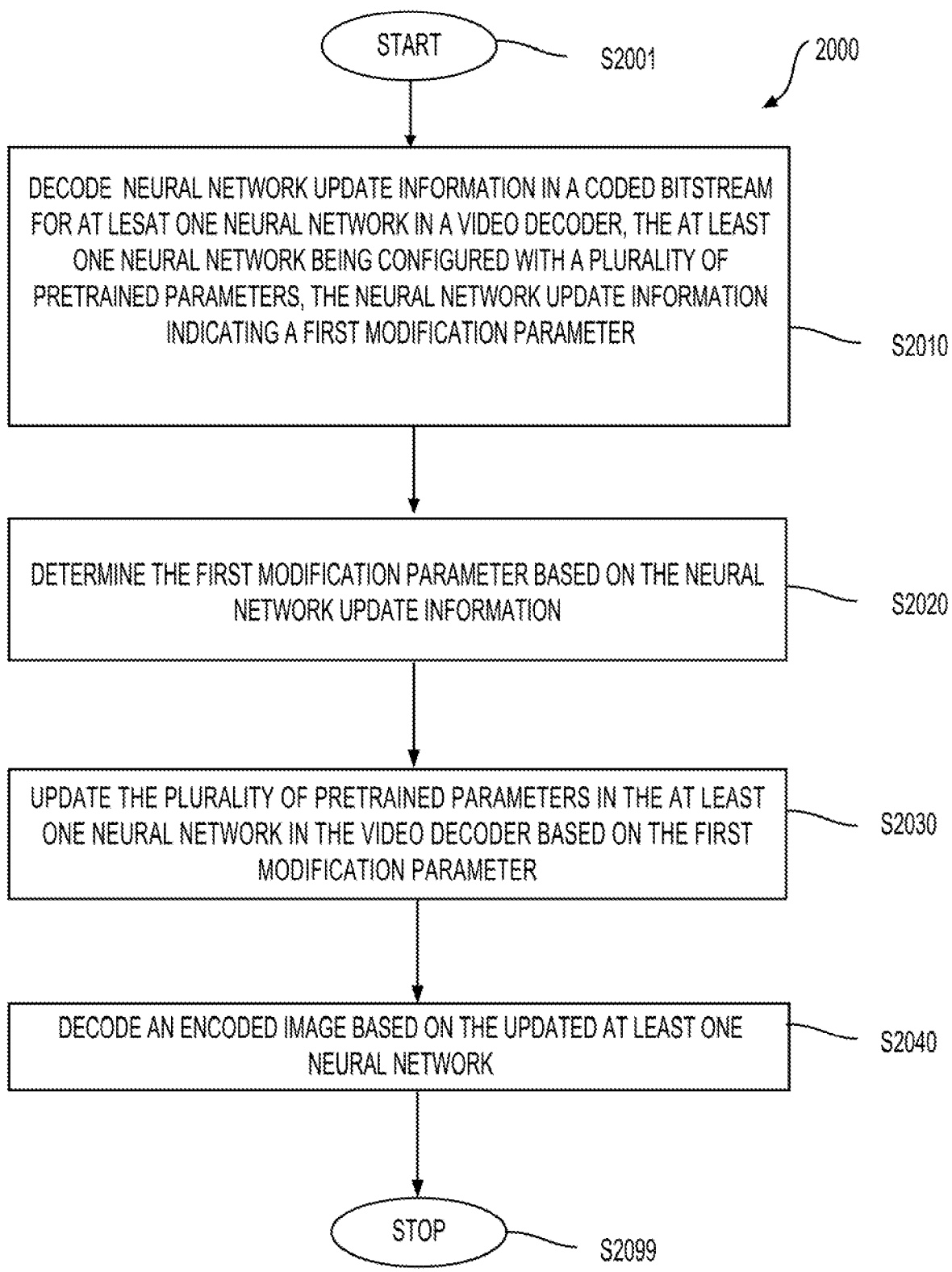
FIG. 20 shows a flow chart outlining a process according to an embodiment of the disclosure.

FIG. 20 shows a flow chart outlining a process (2000) according to an embodiment of the disclosure. The process (2000) can be used in the reconstruction of an encoded image. In various embodiments, the process (2000) is executed by processing circuitry, such as the processing circuitry in the terminal devices (310), (320), (330) and (340), the processing circuitry that performs functions of the video decoder (1600B), the processing circuitry that performs functions of the video decoder (1800) or the processing circuitry that performs functions of the NIC framework (900). In an example, the processing circuitry performs a combination of functions of (i) one of the video decoder (410), the video decoder (510), and the video decoder (810) and (ii) one of the video decoder (1600B) or the video decoder (1800). In some embodiments, the process (2000) is implemented in software instructions, thus when the processing circuitry executes the software instructions, the processing circuitry performs the process (2000). The process starts at (S2001). In an example, an NIC framework is based on neural networks. In an example, the NIC framework is the NIC framework (900) described with reference to FIG. 9. The NIC framework can be based on CNNs, such as described with reference to FIGS. 10-15. A video decoder (e.g., (1600B) or (1800)) can include multiple components in the NIC framework, as described above. The NIC framework based on neural networks can be pretrained. The video decoder can be pretrained with pretrained parameters. The process (2000) proceeds to (S2010).

At (S2010), neural network update information in a coded bitstream can be decoded. The neural network update information can be for at least one neural network in the video decoder. The at least one neural network can be predefined or indicated in the coded bitstream or neural network update information. The at least one neural network can be configured with a set of pretrained parameters. The neural network update information can correspond to an encoded image to be reconstructed and indicate a first modification parameter.

In an example, the first modification parameter is a scaling factor. The neural network update information can further indicate an offset to modify the set of pretrained parameters.

In an example, the first modification parameter is an offset.

In an example, the set of pretrained parameters includes biases in a convolutional layer of one of the at least one neural network.

In an example, the set of pretrained parameters includes weights in a convolutional kernel of a convolutional layer of one of the at least one neural network.

In an example, the video decoder is the video decoder (1800) shown in FIG. 18. The neural network is the main decoder network (915).

In an example, the video decoder is the video decoder (1600B) shown in FIG. 16B. In an example, the at least one neural network is one of the main decoder network (915), the context model NN (916), the entropy parameter NN (917), and the hyper decoder (925). For example, the at least one neural network is the context model NN (916). The at least one neural network in the video decoder can include a plurality of the main decoder network (915), the context model NN (916), the entropy parameter NN (917), and the hyper decoder (925).

At (S2020), the first modification parameter can be determined based on the neural network update information. In an embodiment, an updated parameter is obtained from the neural network update information. In an example, the updated parameter can be obtained from the neural network update information by decompression. In an example, the neural network update information indicates the updated parameter being a difference (e.g., 0.1) between the first modification parameter (e.g., a scaling factor of 1.1) and a pretrained modification parameter (e.g., a scaling factor of 1), and the first modification parameter can be calculated according to a sum of the updated parameter and the pretrained modification parameter. In an embodiment, the first modification parameter is determined to be the updated parameter.

At (S2030), the set of pretrained parameters in the at least one neural network in the video decoder can be updated based on the first modification parameter. For example, the set of pretrained parameters corresponds to the nine weights in the first channel (e.g., c1) of the third deconvolutional layer (DeConv: 3×3 c384 s1) in the CNN shown in FIG. 13 of the hyper decoder (925).

In an example, when the first modification parameter is the scaling factor, the set of pretrained parameters is replaced with a set of replacement parameters, respectively, where the set of replacement parameters is the set of pretrained parameters multiplied with the scaling factor.

In an example, the first modification parameter is an offset, the offset is added to the set of pretrained parameters in the at least one neural network to update the set of pretrained parameters.

At (S2040), the encoded image in the bitstream can be decoded by the updated video decoder, for example, based on the updated at least one neural network. An output image generated at (S2040) can be any suitable image(s) having any suitable size(s). In some examples, the output image includes a reconstructed raw image, a natural image, a computer-generated image, and/or the like that is in the spatial domain.

In some examples, the output image of the video decoder includes residue data in the spatial domain, and thus further processing can be used to generate a reconstructed image based on the output image. For example, the reconstruction module (874) is configured to combine, in the spatial domain, the residue data and prediction results (as output by the inter or intra prediction modules) to form reconstructed blocks that may be part of a reconstructed image. Additional suitable operations, such as a deblocking operation and the like, can be performed to improve the visual quality. Components in various apparatuses can be suitably combined to achieve (S2040), for example, referring to FIGS. 8 and 9, the residue data from the main decoder network (915) in the video decoder and the corresponding prediction results are fed into the reconstruction module (874) to generate the reconstructed image.

In an example, the bitstream further includes one or more encoded bits used to determine a context model for decoding the encoded image. The video decoder can include a main decoder network (e.g., (911)), a context model network (e.g., (916)), an entropy parameter network (e.g., (917)), and a hyper decoder network (e.g., (925)). The at least one neural network includes one or more of the main decoder network, the context model network, the entropy parameter NN, and the hyper decoder network. The one or more encoded bits can be decoded using the hyper decoder network. An entropy model (e.g., a context model) can be determined using the context model network and the entropy parameter network based on the decoded bits and quantized latent of the encoded image that is available to the context model network. The encoded image can be decoded using the main decoder network and the entropy model.

The process (2000) proceeds to (S2099), and terminates.

The process (2000) can be suitably adapted to various scenarios and steps in the process (2000) can be adjusted accordingly. One or more of the steps in the process (2000) can be adapted, omitted, repeated, and/or combined. Any suitable order can be used to implement the process (2000). Additional step(s) can be added.

For example, at (S2040), one or more additional encoded images in the coded bitstream are decoded based on the updated neural network. Thus, the encoded image and the one or more additional encoded images can share the same neural network update information.

In an example, the neural network update information indicates a second modification parameter for the at least one neural network configured with a second set of pretrained parameters. At (S2030), the second set of pretrained parameters in the at least one neural network can be updated based on the second modification parameter. In an example, the set of pretrained parameters includes weights in a convolutional kernel of a convolutional layer of one of the at least one neural network, and the second set of pretrained parameters includes biases of the convolutional layer of the one of the at least one neural network.

Embodiments in the disclosure may be used separately or combined in any order. Further, each of the methods (or embodiments), an encoder, and a decoder may be implemented by processing circuitry (e.g., one or more processors or one or more integrated circuits). In one example, the one or more processors execute a program that is stored in a non-transitory computer-readable medium.

This disclosure does not put any restrictions on methods used for an encoder such as a neural network based encoder, a decoder such as a neural network based decoder. Neural network(s) used in an encoder, a decoder, and/or the like can be any suitable types of neural network(s), such as a DNN, a CNN, and the like.

Thus, the content-adaptive online training methods of this disclosure can accommodate different types of NIC frameworks, e.g., different types of encoding DNNs, decoding DNNs, encoding CNNs, decoding CNNs, and/or the like.

V. An Exemplary Computer System for Implementing Embodiments of the Disclosure

The techniques described above, can be implemented as computer software using computer-readable instructions and physically stored in one or more computer-readable media. For example, FIG. 21 shows a computer system (2100) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 21:
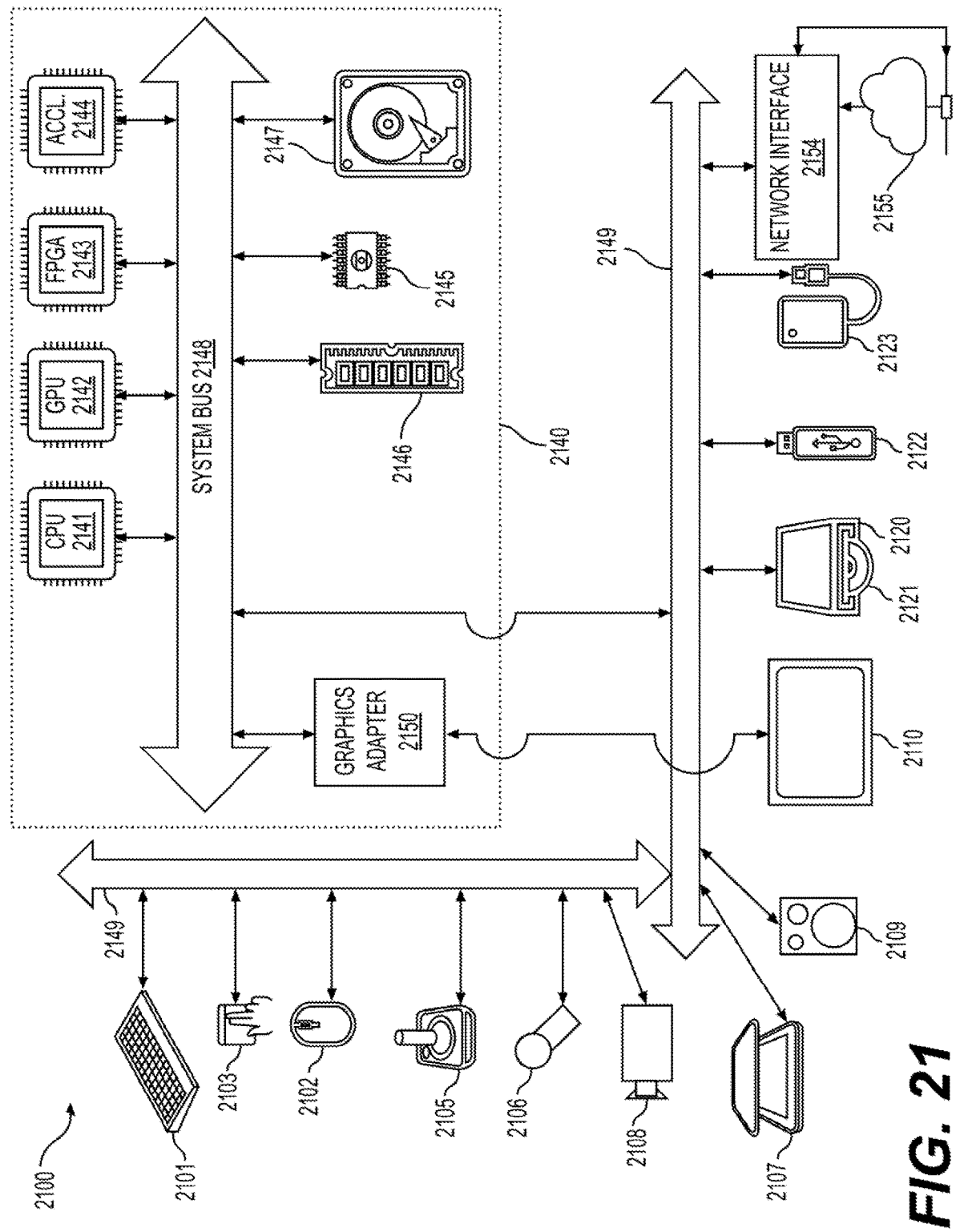
FIG. 21 is a schematic illustration of a computer system in accordance with an embodiment.

The components shown in FIG. 21 for computer system (2100) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (2100).

Computer system (2100) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (2101), mouse (2102), trackpad (2103), touch screen (2110), data-glove (not shown), joystick (2105), microphone (2106), scanner (2107), camera (2108).

Computer system (2100) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (2110), data-glove (not shown), or joystick (2105), but there can also be tactile feedback devices that do not serve as input devices), audio output devices (such as: speakers (2109), headphones (not depicted)), visual output devices (such as screens (2110) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (2100) can also include human accessible storage devices and their associated media such as optical media including CD/DVD ROM/RW (2120) with CD/DVD or the like media (2121), thumb-drive (2122), removable hard drive or solid state drive (2123), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (2100) can also include an interface (2154) to one or more communication networks (2155). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (2149) (such as, for example USB ports of the computer system (2100)); others are commonly integrated into the core of the computer system (2100) by attachment to a system bus as described below (for example Ethernet interface into a PC computer system or cellular network interface into a smartphone computer system). Using any of these networks, computer system (2100) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (2140) of the computer system (2100).

The core (2140) can include one or more Central Processing Units (CPU) (2141), Graphics Processing Units (GPU) (2142), specialized programmable processing units in the form of Field Programmable Gate Areas (FPGA) (2143), hardware accelerators for certain tasks (2144), graphics adapters (2150), and so forth. These devices, along with Read-only memory (ROM) (2145), Random-access memory (2146), internal mass storage such as internal non-user accessible hard drives, SSDs, and the like (2147), may be connected through a system bus (2148). In some computer systems, the system bus (2148) can be accessible in the form of one or more physical plugs to enable extensions by additional CPUs, GPU, and the like. The peripheral devices can be attached either directly to the core's system bus (2148), or through a peripheral bus (2149). In an example, the screen (2110) can be connected to the graphics adapter (2150). Architectures for a peripheral bus include PCI, USB, and the like.

CPUs (2141), GPUs (2142), FPGAs (2143), and accelerators (2144) can execute certain instructions that, in combination, can make up the aforementioned computer code. That computer code can be stored in ROM (2145) or RAM (2146). Transitional data can be also be stored in RAM (2146), whereas permanent data can be stored for example, in the internal mass storage (2147). Fast storage and retrieve to any of the memory devices can be enabled through the use of cache memory, that can be closely associated with one or more CPU (2141), GPU (2142), mass storage (2147), ROM (2145), RAM (2146), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (2100), and specifically the core (2140) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (2140) that are of non-transitory nature, such as core-internal mass storage (2147) or ROM (2145). The software implementing various embodiments of the present disclosure can be stored in such devices and executed by core (2140). A computer-readable medium can include one or more memory devices or chips, according to particular needs. The software can cause the core (2140) and specifically the processors therein (including CPU, GPU, FPGA, and the like) to execute particular processes or particular parts of particular processes described herein, including defining data structures stored in RAM (2146) and modifying such data structures according to the processes defined by the software. In addition or as an alternative, the computer system can provide functionality as a result of logic hardwired or otherwise embodied in a circuit (for example: accelerator (2144)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC))

storing software for execution, a circuit embodying logic for execution, or both, where appropriate. The present disclosure encompasses any suitable combination of hardware and software.

Appendix A: Acronyms
JEM: joint exploration model
VVC: versatile video coding
BMS: benchmark set
MV: Motion Vector
HEVC: High Efficiency Video Coding
SEI: Supplementary Enhancement Information
VUI: Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
LTE: Long-Term Evolution
CANBus: Controller Area Network Bus
USB: Universal Serial Bus
PCI: Peripheral Component Interconnect
FPGA: Field Programmable Gate Areas
SSD: solid-state drive
IC: Integrated Circuit
CU: Coding Unit
NIC: Neural Image Compression
R-D: Rate-Distortion
E2E: End to End
ANN: Artificial Neural Network
DNN: Deep Neural Network
CNN: Convolution Neural Network While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for video decoding in a video decoder, the method comprising:
decoding neural network update information in a coded bitstream for at least one neural network in the video decoder, the at least one neural network being configured with a set of pretrained parameters corresponding to a first set of training images, the neural network update information indicating a first modification parameter indicating a scaling factor or offset applicable to the pretrained parameters based on a second set of training images different from the first set of training images;
updating the set of pretrained parameters in the at least one neural network in the video decoder by applying the scaling factor or offset of the first modification parameter to the pretrained parameters; and
decoding an encoded image based on the updated at least one neural network.

2. The method of claim 1, wherein
the first modification parameter is the scaling factor, and
the updating includes replacing the set of pretrained parameters with a set of replacement parameters, respectively, the set of replacement parameters being the set of pretrained parameters multiplied with the scaling factor.

3. The method of claim 1, wherein
the first modification parameter is the offset, and
the updating includes adding the offset to the set of pretrained parameters in the at least one neural network.

4. The method of claim 2, wherein
the neural network update information further indicates the offset to modify the set of pretrained parameters, and
the updating includes adding the offset to the set of replacement parameters in the at least one neural network.

5. The method of claim 1, wherein
the coded bitstream further indicates one or more encoded bits directed to a context model for decoding the encoded image,
the at least one neural network includes a main decoder network, a context model neural network, an entropy parameter neural network, and a hyper decoder network in the video decoder,
the method further includes:
decoding the one or more encoded bits using the hyper decoder network, and
determining the context model using the context model neural network and the entropy parameter neural network based on the decoded bits and a quantized latent of the encoded image that is available to the context model neural network, and
the decoding the encoded image includes decoding the encoded image with the main decoder network and the context model.

6. The method of claim 1, wherein the at least one neural network is one or more of a main decoder network, a context model neural network, an entropy parameter neural network, or a hyper decoder network in the video decoder.

7. The method of claim 1, wherein the set of pretrained parameters includes biases in a convolutional layer of one of the at least one neural network.

8. The method of claim 1, wherein
the set of pretrained parameters includes weights in a convolutional kernel of a convolutional layer of one of the at least one neural network.

9. The method of claim 1, wherein
the neural network update information indicates a second modification parameter for the at least one neural network configured with a second set of pretrained parameters, and
the updating includes updating the second set of pretrained parameters in the at least one neural network based on the second modification parameter.

10. The method of claim 9, wherein
the set of pretrained parameters includes weights in a convolutional kernel of a convolutional layer of one of the at least one neural network, and
the second set of pretrained parameters includes biases of the convolutional layer of the one of the at least one neural network.

11. The method of claim 1, further comprising:
decoding another encoded image in the coded bitstream based on the updated at least one neural network.

12. An apparatus for video decoding, comprising:
processing circuitry configured to:
  decode neural network update information in a coded bitstream for at least one neural network in the apparatus for video decoding, the at least one neural network being configured with a set of pretrained parameters corresponding to a first set of training images, the neural network update information indicating a first modification parameter indicating a scaling factor or offset applicable to the pretrained parameters based on a second set of training images different from the first set of training images;
  update the set of pretrained parameters in the at least one neural network in the apparatus for video decoding by applying the scaling factor or offset of the first modification parameter to the pretrained parameters; and
  decode an encoded image based on the updated at least one neural network.

13. The apparatus of claim 12, wherein
the first modification parameter is the scaling factor, and
the processing circuitry is configured to replace the set of pretrained parameters with a set of replacement parameters, respectively, the set of replacement parameters being the set of pretrained parameters multiplied with the scaling factor.

14. The apparatus of claim 12, wherein
the first modification parameter is the offset, and
the processing circuitry is configured to add the offset to the set of pretrained parameters in the at least one neural network.

15. The apparatus of claim 13, wherein
the neural network update information further indicates the offset to modify the set of pretrained parameters, and
the processing circuitry is configured to add the offset to the set of replacement parameters in the at least one neural network.

16. The apparatus of claim 12, wherein the set of pretrained parameters includes biases in a convolutional layer of one of the at least one neural network.

17. The apparatus of claim 12, wherein
the set of pretrained parameters includes weights in a convolutional kernel of a convolutional layer of one of the at least one neural network.

18. The apparatus of claim 12, wherein
the neural network update information indicates a second modification parameter for the at least one neural network configured with a second set of pretrained parameters, and
the processing circuitry is configured to update the second set of pretrained parameters in the at least one neural network based on the second modification parameter.

19. The apparatus of claim 18, wherein
the set of pretrained parameters includes weights in a convolutional kernel of a convolutional layer of one of the at least one neural network, and
the second set of pretrained parameters includes biases of the convolutional layer of the one of the at least one neural network.

20. A non-transitory computer-readable storage medium storing a program executable by at least one processor to perform:
  decoding neural network update information in a coded bitstream for at least one neural network in a video decoder, the at least one neural network being configured with a set of pretrained parameters corresponding to a first set of training images, the neural network update information indicating a first modification parameter indicating a scaling factor or offset applicable to the pretrained parameters based on a second set of training images different from the first set of training images;
  updating the set of pretrained parameters in the at least one neural network in the video decoder by applying the scaling factor or offset of the first modification parameter to the pretrained parameters; and
  decoding an encoded image based on the updated at least one neural network.

* * * * *